United States Patent [19]
Botvinnik et al.

[11] 3,859,578
[45] Jan. 7, 1975

[54] METHOD AND CIRCUIT FOR CONTROLLING AN ASYNCHRONIZED-SYNCHRONOUS MACHINE

[76] Inventors: Mikhail Moiseevich Botvinnik, 3, Frunzemskaya ulitsa, 7, kv. 154; Jury Gevondovich Shakaryan, Festivalnaya ulitsa, 15, korpus 4, kv. 101; Ivan Yakovlevich Dovganjuk, ulitsa N. Krupskoi, 5, kv. 40; Boris Petrovich Klimov, Malaya Tulskaya ulitsa, 2/1, korpus 4, kv. 281, all of Moscow; Mikhail Ivanovich Zhuchkov, Moskovsky prospekt, 96a, kv. 220, Kharkov; Jury Gordeevich Borzyak, Armyansky pereulok, 1/3, kv. 76, Kharkov; German Mikhailovich Tjufilin, Moskovsky prospekt, 192/1, kv. 46, Kharkov; Mikhail Vladimirovich Baksht, Pavlovo pole, 81, kv. 9, Kharkov; Nikolai Nikolaevich Blotsky, 2 Kievskaya ulitsa, 24, kv. 8; Tatyana Vasilievna Plotnikova, Sojuzny prospekt, 22, korpus 2, kv. 171, both of Moscow; Oleg Nikolaevich Filichev, Kandalakshsky raion poselok, Zarechensk, Nivskaya ulitsa, 5, kv. 3, Murmanskaya oblast, all of U.S.S.R.

[22] Filed: Jan. 22, 1973

[21] Appl. No.: 325,932

[52] U.S. Cl. .............................. 318/197, 318/237
[51] Int. Cl. ............................................ H02p 7/36
[58] Field of Search .......... 318/187, 197, 200, 205, 318/237

[56] References Cited
UNITED STATES PATENTS

| | | | |
|---|---|---|---|
| 2,213,945 | 9/1940 | Alexanderson | 318/197 X |
| 3,136,937 | 6/1964 | Miljanic | 318/197 |
| 3,611,082 | 10/1971 | Schmitz | 318/197 X |
| 3,667,012 | 5/1972 | Kilgore | 318/197 X |

Primary Examiner—G. Z. Rubinson
Attorney, Agent, or Firm—Waters, Roditi, Schwartz & Nissen

[57] ABSTRACT

A method of and circuit for controlling an A.C. electric machine such as for example, an asynchronized-synchronous machine operating under generator-duty or motor-duty conditions, which has one winding connected to a power supply main and the other winding connected to a controlled frequency converter. The method and circuit ensures stable operation of the machine in the prescribed range of torque and speed variation and provides for improved transient characteristics during sequences of speed, voltage or reactive power control. To accomplish this end, two independently controlled e.m.f. components are formed in the stator winding of the machine, the first e.m.f. component coinciding with the direction of the stator voltage vector, the second e.m.f. component being perpendicular to this vector, and the amplitude of the first e.m.f. component being varied in accordance with the setting, while the amplitude of the second e.m.f. component is varied in proportion to the instantaneous slip.

17 Claims, 23 Drawing Figures

METHOD AND CIRCUIT FOR CONTROLLING AN ASYNCHRONIZED-SYNCHRONOUS MACHINE

The invention relates to a method and circuit for controlling an A.C. electric machine, and, more particularly to a method and circuit for controlling an asynchronized-synchronous machine capable of operating either as a generator or as a motor, in which one of the windings thereof is connected to a power supply main and the other to a controlled frequency converter.

An asynchronized-synchronous machine, i.e. a controlled A.C. machine is essentially an A.C. electric machine comprising, as a rule, a stator with a three-phase winding and a magnetically and electrically symmetrical rotor with a two-phase or three-phase winding. Regarding its design and constructional features, the asynchronized-synchronous machine does not differ from an asynchronous machine having a wound rotor.

A variable-frequency and variable amplitude voltage is fed to the rotor (stator) winding of an asynchronized-synchronous machine, while the voltage supplied to the stator (rotor) winding has a constant frequency and amplitude. By varying the frequency $\omega_f$ of the voltage supplied to the rotor winding, the rotor is caused to operate under variable-speed conditions, while the magnitudes of, respectively the active and reactive power of the stator are controlled by varying the magnitude and phase of that voltage. Under steady-state conditions of operation, the supply frequency $\omega_s$, the speed of rotation of the rotor $\omega_R$, and the frequency of the voltage across the rotor winding $\omega_f$ form the following relation:

1a. $\omega_S = \omega_A + \omega_f.$

It follows that, for $\omega_S = $ const, and with the voltage frequency $\omega_f$ varying, the speed of rotation of the rotor $\omega_R$ must vary; while conversely, the frequency $\omega_f$ must vary as $\omega_R$ varies.

The above equation can be satisfied by forming the circuit for controlling an asynchronized-synchronous machine in accordance with two known principles. FIG. 1 shows a block diagram embodying one of these principles, according to which the machine operating, for example, under motor-duty conditions is controlled in the following manner. A unit 1 forming reference frequency $\omega_f$ generates signals which are fed to a controller 2 and a frequency converter 3, the latter being coupled with the machine rotor 4.

As the frequency $\omega_f$ varies, so does the speed of rotation of the machine rotor.

FIG. 2 is a block diagram of a circuit embodying the other one of the above principles.

According to this principle, the machine being, for instance, on motor duty is controlled in the following way. Signals $\omega_R$ are generated, for example, by a synchronous tachometer generator or transmitter 5. These signals and the signals of the mains frequency $\omega_S$ are supplied to a controller 6 whose output frequency is equal to $\omega_f$.

From the controller 6 the signals are fed to a frequency converter 7 and thence to the machine rotor 8.

Speed control is achieved by varying the controller signal magnitude, which causes a variation in the rotor speed.

As has been shown by the inventors of the present invention, M. Botvinnik and Yu. Shakaryan — in the publication "A Controlled A.C. Machine," 1970, U.S.S.R., machines of the first type exhibit the properties of conventional synchronous machines, i.e., in the speed of rotation of their rotors is determined by the frequency $\omega_f$ of the rotor voltage, and at $\omega_f = $ const, the speed of rotation remains constant and independent of the shaft torque. The stability of operation of such machines is determined by an angle $\theta$ between the stator voltage vector and the stator e.m.f. vector, while their reactive power is controlled by varying the magnitude of the rotor current. As distinct from conventional synchronous machines, such machines cna operate under variable speed conditions.

With regard to their stability, machines of the second type are similar to asynchronous machines is that their stability depends upon the amount of slip of the machine, rather than on angle $\theta$. Another similarity with asynchronous machines consists of in that the frequency of the current in the rotor winding varies with the speed of rotation, and as the shaft torque exceeds the rated value, the speed of rotation also varies. However, as distinct from asynchronous machines, the machines in question are capable of generating reactive power, and operate under generator-duty and motor-duty conditions at speeds of rotation above and below the synchronous one speed.

The above two types of asynchronized-synchronous machine, represent, in fact, two different operating conditions of one and the same machine, which is why the first condition is referred to as "generalized synchronous," and the other as "generalized asynchronous." This classification worked out by the Soviet scientist V. Kasyanov in 1931 has been accepted by these authors and is used hereinafter in the description.

Asynchronized-synchronous machines are known to possess a high degree of efficiency of speed control, which is made possible by the fact that the slip-proportional power in the rotor circuit is not lost in rotor resistors, but due to the frequency converter, is returned either to the power supply mains, or to the shaft of the machine if the frequency converter is supplied from an auxiliary generator mounted on the same shaft as that of the machine. In order that the speed of the machine may be controlled to a standstill, the power rating of the frequency converter should be about equal to that of the machine. In such case, asynchronized-synchronous machines offer no particular advantages over the known frequency-controlled asynchronous and synchronous motors. However, asynchronized-synchronous motors prove of particular utility for those mechanisms which require speed control within 150 to 50 per cent of the synchronous one, rather than full-range speed control down to standstill. The cases in point are fans, pumps, grinders, compressors, etc. For these mechanisms, asynchronized-synchronous motors are unrivaled in terms of performance and economic advantages.

The mentioned mechanisms can employ asynchronized-synchronous machines operating both under the "generalized synchronous" and "generalized asynchronous" conditions. Thus, when it is required that the drive should have absolutely fixed mechanical characteristics, i.e., the speed of rotation of the rotor should be independent of the torque, preference should be given to machines operating under "generalized synchronous" conditions; when improved stability and dynamic characteristics, which are dealt with later on in the disclosure, are the primary requirement, the "generalized asynchronous" mode should be selected.

Asynchronized-synchronous motors operating in a "generalized asynchronous" mode can likewise be employed in electric drives subjected to an impact load on the shaft. The principle of this known kind of control, called power control, consists of in that the power input to the machine is constant in spite of the impact character of the shaft load, in effect, the speed of rotation of the machine rotor varies.

Asynchronized-synchronous generators, particularly operating in an "asynchronous" mode, are capable of ensuring stable transmission of A.C. power over great distances irrespective of the magnitude of angle $\theta$. Hence, as borne out by theoretical and experimental investigations, such generators find wide application in power-distribution networks as a means of improving their stability irrespective of the length of the transmission lines.

These generators can also be successfully employed for generating constant-frequency electric power under conditions of variable-speed rotation of the generator shaft.

Theoretical and experimental investigations indicate that asynchronized-synchronous machines operating in a "generalized synchronous" mode have a propensity for hunting. Thus, at slips exceeding the natural critical slip value, such machines, as a rule, are driven into an undamped-oscillation mode. This provides an explanation as to the reason why the stability of these machines is impaired. In an asynchronized-synchronous machine operating under steady-state conditions at a slip $\omega_R \neq \omega_S$, the electromagnetic moment may be represented by the following equation, neglecting the resistance of the stator windings:

$$(2a) \quad M = \left(\frac{1}{x'} - \frac{1}{x}\right) \frac{\frac{S}{S_{cr}} U^2}{1 + \frac{S^2}{S^2_{cr}}} + \frac{UU_f \sin\theta}{x\sqrt{1 + \frac{S^2}{S^2_{cr}}}} = M_A + M_f.$$

Here the first component can be called an asynchronous machine moment $Ma$, through an analogy with an asynchronous machine operating at an asynchronous speed, and the second component $M_f$ is an additional moment due to the voltage supply to the machine rotor. The sign of the latter moment is determined by the value of $\sin\theta$.

In the above formula, $x$ and $x'$ are respectively the synchronous inductive reactance and the transient reactance of the stator; $S_{cr}$ is the critical slip corresponding to $M_A = M_{A\ max}$; $S$ is the present magnitude of the slip; $U$ and $U_f$ are the voltages of the stator and the rotor, respectively; $\theta$ is the angle between the stator voltage vector $U$ and the vector of the stator e.m.f. due to the voltage $U_f$.

The conditions of stability of an asynchronized-synchronous machine, operating in a "generalized synchronous" mode, can be obtained with a sufficient degree of accuracy from the following characteristic equation of the second order:

$$Jp^2 + p\ \partial M_A/\partial S + \partial M_f/\partial\theta = 0,$$

3a.

where $J$ is the moment of inertia of the machine. According to the Routh-Hurwitz criteria, the stability condition is written $$\partial M_f/\partial\theta' > 0; \quad \partial M_A/\partial S > 0.$$

4a.

Here the first condition — what may be called "limits of deviation from synchronism" — corresponds to the stability condition of a conventional synchronous machine:

$$-90° < \theta' < 90°.$$

5a.

The second stability condition characterizes the so-called "stability with respect to spontaneous hunting." Indeed, at $\partial M_A/\partial S\ \ \partial 0$, the machine will exhibit hunting phenomena at a constant or growing amplitude. However the condition leads to the requirement:

$$|S| < |S_{cr}|.$$

6a.

Therefore, at absolute values of the slip exceeding the critical slip, the stability of operation will be impaired.

Increasing the critical value of the slip enables an increase in the range of stable speeds. To this end, it has been suggested that a resistor be coupled into the rotor circuit, as mentioned in J. Haberland, Die selbsterregte Schwingungen der Drehstromdoppelfeldmotoren, Archiv fur Electrotechnik, 1927, Heft 10. Such a method clearly impairs the efficiency of an asynchronized-synchronous machine operating in a "generalized synchronous" mode, thereby adversely affecting the economy of its operation. For this reason, the asynchronized-synchronous machine has found no application in its "generalized synchronous" mode of operation.

With respect to the "generalized asynchronous" mode of operation of asynchronized-synchronous machines, it has been shown, both theoretically and experimentally, that here no undamped oscillations arise and, hence, the range of working speeds is larger than in the previously discussed case. That is why it is this particular mode of operation of the asynchronized-synchronous machine which has long been in the foreground of research in various countries throughout the world.

A.C. commutator machines have previously been employed as frequency converters, from the turn of the century until about 1935–40. Nevertheless, machines comprising commutator-type frequency converters had found no wide application, and interest in them has all but vanished. The primary well-known disadvantage of such a system is a considerable inertia of the commutator-type frequency converter which it employs, with a resultant substantial decrease in the stability range of the machine-reduced range of speed control, sharp deterioration of the dynamic characteristics of the system, in effect transient characteristics, etc.. In addition, such machines have power rating limitations and are subject to further drawbacks: high cost, excessive size and poor switching characteristics which entail sparking in the commutator.

With the advent of semiconductors, and particularly high-power thyristors, asynchronized-synchronous machines have again moved to the forefront.

Presently, direct-coupled thyristor frequency converters, also known as cycloinverters, are practically universally employed as frequency converters for such types of machines, both in the Soviet Union and elsewhere. These frequency converters are free from the above-mentioned disadvantages.

The stability of an asynchronized-synchronous machine, the, in effect transient characteristics thereof, are determined by the law of variation of the frequency converter input voltage. Assuming, with a sufficient degree of accuracy, that a frequency converter is a power amplifier with a gain $K_y$, the method of controlling an asynchronized-synchronous machine can be interpreted so as to imply the functional relationship of the frequency, phase and vector size of the voltage at the output of the frequency converter.

The resultant vector of the current through the rotor winding, stator e.m.f., of an asyncronized-synchronous machine is obtained by adding the instantaneous currents in the rotor phases.

If all of the currents are symmetrical, i.e., if they have an identical amplitude and are displaced by the respective angles $\pi/2$ for a two-phase rotor and $2/3\ \pi$ for a three-phase one, the resultant vector will describe a circumference in space.

In practice, however, absolute symmetry of the rotor currents is unattainable. The reasons are many: gain differential, asymmetry of the signals of the synchronous tachometer generator, etc. This sort of asymmetry engenders fluctuations of the machine speed, power values and voltage vectors, all producing an adverse effect in the operation of the machine.

A method of controlling an asynchronized-synchronous motor which provides, within a specified range of speeds, for a constant level of the active and reactive power input, is disclosed in West German Pat. No. 1563740, issued to Siemens company.

The German patent describes a method of controlling a motor where the moment applied to the shaft is of an impact nature, and in which it is required that the machine have a constant active power input equal to the mean value for the impact load cycle, and a constant reactive power input.

As follows from the German specification, the inventors of the patent did not intend to ensure speed control and stability under steady-state conditions of operation nor did they apparently intend to ensure stability of machines operating within parallel on generator duty in a power-distribution system.

The active and reactive power feedback employed in above mentioned German patent, as analyzed, is capable of eliminating power fluctuations due to the asymmetry in the control channels. However, this feedback is ineffective when the machine operates, for instance, on generator duty at no load or under short circuit. Moreover, at a rupture of stator phases, the efficiency of feedback control is impaired. Yet, it is precisely under such conditions that the effect of asymmetry is most often required to be nullified. The most characteristic is the no-load condition before the generator has been connected to the power supply mains. In the case of asymmetry in the control channels, there thus arise fluctuations in the amplitude and phase of the voltage vector on the stator winding, while connection to the mains is accompanied by electric and electromechanical shocks of considerable force, the latter circumstance being of particular importance insofar as concern large electrical machines.

One of the inventors of the present invention, in the publication by Botvinnik M. M. "Asynchronized Synchronous Machines," Oxford, Pergamon Press, 1964, suggested to vary the voltage $U_f$ at the frequency converter input according to the following law:

$$\bar{U}_f = (\lambda_0 + \alpha_1 S)\epsilon^{j(\delta + A)} - K\bar{i}_f,$$

7a.

where
$i_f$ is the vector of the instantaneous rotor currents;
S is the slip of the machine;

$$\delta = \int_0^t S\omega_s dt;$$

$\epsilon$ is the base of natural logarithms.

Factors $K$, $\alpha_0$ and $\alpha_1$ define respectively: the machine rotor feedback; the working slip; and the rigidity of the linear mechanical characteristic of the machine.

The value of $A$ determines the assigned angle between the e.m.f. and the voltage of the stator, i.e., the absolute magnitude of the reactive power of the machine.

The above relation is plotted in cartesian coordinates rotating in unison with the rotor.

It has been shown that at $K \rightarrow \infty$, the machine will operate at a sufficient stability under alll conditions, provided $\alpha_1 > 0$ and the shaft torque $M$ is other than zero.

A method for controlling an asynchronized-synchronous machine according to the above law has been described by the applicant of the present invention in U.K. Pat. No. 1170191. This patent is considered herein as a prototype.

As has been shown in various tests, a device embodying the above method ensures almost inertialess control. The device employs D.C. operational amplifiers and semiconductor multiplier units.

This control method provides for speed and reactive power control while ensuring stable machine operation within certain limits, both under motor- and generator-duty conditions. It will be noted in passing that, presently generator speed is sometimes required to be controlled, for instance, at tidal power stations and hydraulic power stations having a storage capacity.

Subsequent theoretical and experimental investigations have revealed that the above mentioned method fails to ensure stability of operation at whatever values of the torque, speed and reactive power are required; nor does it provide for high transient characteristics; while failing to e.iminate the e.m.f. vector fluctuations which may be cause to any kind of asymmetry in the control channels.

This point is now referred to in a more detailed discussion hereinbelow.

The value of factor K is practically limited and cannot be equal to infinity. In this case, theoretical analysis permits the condition of stability of such a machine, $\partial M/\partial S > 0$, to be expressed in the following form::

(8a) $$\frac{I}{(I+K)|S_{or}|} \cdot \left[\frac{U^2}{x'} + Q - M\frac{S}{|S_{or}|\cdot(I+K)}\right] \pm$$
$$\pm \frac{\alpha_1}{[\alpha_0 + \alpha_1 S]} \cdot (M - M_{AK}) > 0.$$

In this formula, the "+" sign before the second term refers to the case where $M > 0$ for generator duty; the "-" sign corresponds to the $M < 0$ for motor duty.

The term (9a) $$M = \left(\frac{1}{x'} - \frac{1}{x}\right) \frac{\frac{S}{S_{or}(I+K)} U^2}{I + \frac{S^2}{S^2_{or}(I+K)^2}}$$

is the moment of an induction motor with due regard to compensation, i.e., with due regard to the rotor current feedback. It follows that at $K = \infty$, the stability condition turns into $\pm \alpha_1 M/|\alpha_0 + \alpha_1 S| > 0$. i.e., it is always satisfied at $M \neq 0$, which corroborates the foregoing statement.

Analysing the stability condition for a finite factor $K$, at $\alpha_1 = 0$, the second term of the inequality disappears and there arises a relationship among $Q$, $M$ and $S$ which determines the range of stable operation. It is easily verifiable that for conventional machines this range is sufficiently narrow. Thus, for a 1,000-kW machine, the range of stable operation at $Q = 0$ and at rated power corresponds to the slip $|S| \leq 10$ per cent.

The range of stability can be increased by introducing the second term of the inequality.

However, as follows from the inequality, this sort of control can increase the stability range only when $|M| - M_{AK} > 0$ on generator duty $|M| + M_{AK} > 0$ on motor duty.

10a.

These conditions mean that, under generator-duty conditions the stability at $\alpha_1 > 0$ can be raised only for negative slips, i.e., when $M_{AK} < 0$, and $M - M_{AK} > 0$, while for the case of positive slips, i.e., at $\omega_R > \omega_S$, the stability range will be decreased at $\alpha_1 > 0$. Under motor duty, instability at $\alpha_1 > 0$ set in at $S < 0$, i.e., $\omega_R < \omega_S$. Thus, at a finite factor $K$, there is always an instability range which cannot be reduced by introducing what might be called "artificial" speed stability $\alpha_1 > 0$.

Thus, in conducting experiments with a 1,000-kW motor at a nominal shaft torque and $K = 3$, stability disturbances were observed at $S \leq +20$ per cent.

Additionally, the automatic control method of U.K. Pat. No. 1170191 does not provide for independent or autonomous speed and reactive power control.

At $K = \infty$, the active and reactive power values are known to be determined by the relations:

$P = M = U(\alpha_0 + \alpha_1 S)/x \cos A$  $Q = -U^2/x + U(\alpha_0 + \alpha_1 S)/x \sin A.$ 11a.

According to these formulas, as $\alpha_0$ varies, so does the speed and also $Q$, whereas a variation of angle $A$ causes a variation not only in the reactive power, but also in the speed. With this method, speed and reactive power control is accompanied by considerable overcontrol and poor characteristics in the transient response.

FIG. 3 is an oscillogram of a transient occurring when the load is applied and thrown off, recorded by an analog computer. It can be seen from the oscillogram that the process of load variation, variation of $M_T$, is accompanied by extensive fluctuations of the reactive power $Q$ and the slip of the rotor.

Nor does the above mentioned method eliminate the variations in the speed, stator e.m.f. vector, power, currents and voltages caused by any kind of asymmetry in the control channels.

An oscillogram, FIG. 4, recorded by an analog computer shows variations of the slip $S$, active and reactive power, $P$ and $Q$ respectively arising due to asymmetry in the control channels $U_{fd}$, $U_{fq}$, of the frequency converter.

It is an object of the present invention to eliminate the abovementioned disadvantages.

Another object is to provide a method of control of an asynchronized-synchronous machine and to produce a control circuit for carrying out the method, which method and circuit provide for stability of its operation in a "generalized synchronous" and a "generalized asynchronous" mode, and for effecting better control.

According to the present invention, there is provided a method of controlling an asynchronized-syncronous machine by varying the frequency and amplitude of a voltage fed to its rotor, or stator winding, the frequency of the voltage varied in proportion to the angle between the voltage vector of a power supply mains connected to the stator, or rotor winding and the e.m.f. vector of a tachometer generator which connected with the shaft of the machine, the amplitude of the voltage being varied in proportion to the slip of the machine, and wherein, according to the invention, two independently controlled e.m.f. components are induced in the stator, or rotor, winding by the rotor, or stator currents, one component coinciding with the direction of the voltage vector of the stator, or rotor circuit, and the other component being perpendicular to this vector, and the amplitude of the first e.m.f. component is varied in accordance with the setting of a frequency-forming means, while the amplitude of the second e.m.f. component is varied in proportion with the instantaneous slip of the machine.

It is preferable to control the asynchronized-synchronous machine so that the frequency-determining means setting is maintained at a constant level.

It is also preferable that the asynchronized-synchronous machine should be controlled so that the setting of the frequency-determining means is varied in proportion to the voltage across the stator, or rotor of the machine.

It is also preferable that the asynchronized-synchronous machine should be controlled so that the setting of the frequency-determining means is varied as the function of the power factor of the machine.

It is also preferable that the asynchronized-synchronous machine is controlled so that two e.m.f. components are formed in its stator, or rotor winding by a frequency converter and means for controlling the latter, which means comprises an operational unit and a functional unit, from which the signals are respectively fed from the output of one to the input of the other, and additionally, from the second output of the functional unit via an/other operational unit of said means signals are fed to the frequency converter, and signals from the mains and from a rotor speed transmitter are fed to the input of the functional unit, while signals from a rotor current transducer are fed to the input of one operational unit.

It is a preferred feature of the invention that the asynchronized-synchronous machine should be controlled so that a signal from the frequency-determining means is fed to the input of the functional unit.

It is another preferred feature that the asynchronized-synchronous machine should be controlled so that the signals from the mains and from the rotor speed transmitter form two independent reference control signals in the functional unit, and by comparing these signals with the output of one operational unit followed by conversion of these signals in another operational unit, the independent control of the e.m.f. components in the stator, or rotor winding of the machine is provided and the steady-state and transient characteristics of the machine improved.

It is another preferable feature that the asynchronized-synchronous machine should be controlled so that the two reference control signals are D.C. formed.

It is also preferred that the asynchronized-synchronous machine should be controlled so that the two reference control signals are formed at the frequency of rotor rotation.

Another preferred aspect lies in that the asynchronized-synchronous machine should be controlled so that said two reference control signals are formed at the power supply mains frequency.

It is also preferable that the asynchronized-synchronous machine should employ a control circuit comprising a frequency converter, means for controlling the latter, a rotor speed transmitter, a frequency-determining means and a rotor current transducer, wherein the means for controlling the frequency converter should be built around a slip unit, a master control unit as well as converters and inverters.

It is also preferable that the slip unit should be built around two series strings, each of which comprises operational amplifiers, a capacitor, two resistors and a rectifier, with one resistor decoupling two operational amplifiers, an additional rectifier shunting a resistor, an operational amplifier and a rectifier connected in series with one another, and a resistor with one grounded lead coupled between a capacitor plate and a resistor.

Four anodes of the rectifiers of the two strings are interconnected and coupled via a resistor to the input of an operational amplifier, with two single-phase full-wave rectifiers coupled via a resistor to the input of said operational amplifier.

It is also preferable that the master control unit should comprise two strings, each of which is built around two operational amplifiers and resistors serially interconnected with one another, with one of the resistors decoupling two operational amplifiers, and another string with an additional potentiometer, the output of each amplifier of said strings being coupled to the respective inputs of multiplier units. The operational amplifiers coupled at the end of each string are shunted in common with a resistor by potentiometers whose contact sliders are respectively coupled via resistors to the inputs of two additional operational amplifiers, to which there are also coupled the outputs of respective multiplier units, while respective potentiometers are coupled to the other inputs of these same additional amplifiers.

It is also preferable that the inverter should comprise three groups of series strings, each group comprising two strings each of which is built around two operational amplifiers and two resistors, one resistor decoupling two operational amplifiers, and with each string being coupled by way of its outputs to the inputs of three respective multiplier units, the outputs thereof being connected together and coupled to the input of an additional amplifier.

It is another preferred feature of the invention that the converter should comprise two groups of series strings, each comprising two strings each of which is built around two operational amplifiers and two resistors, one of the resistors decoupling two operational amplifiers, each string being coupled by way of its outputs to the inputs of two respective multiplier units, the outputs thereof being connected together and coupled to the input of an additional operational amplifier.

The method of controlling an asynchronized-synchronous machine of the present invention ensures its stable and economical operation under both generator- and motor-duty conditions and provides for a substantial improvement of its transient characteristics.

Such asynchronized-synchronous motors find wide application where speed is to be economically controlled within broad limits at a constant torque, and at a torque varying as the speed diminishes.

Asynchronized-synchronous generators also find wide application in power-distribution systems requiring stable power transmission for long distances and generation of constant-frequency voltages at a constant and variable speed of rotation, such as at hydraulic power stations with a storage capacity.

Tests on a 1,000-kW asynchronized-synchronous motor have shown that its speed can be continuously controlled to within $\pm 30$ per cent of the synchronous speed, without any additional device being employed for the passage through the synchronous speed; its rated efficiency is not less than 90 per cent, and the power factor is 0.94, lagging.

Tests on a 50,000-kW asynchronized-synchronous generator have shown that at a speed variation within $\pm 0.5$ per cent the machine operates at a high degree of stability and has excellent performance. Thus, variation of the active and reactive power was within $\pm 3$ per cent, and voltage variation was within $\pm 2$ per cent.

The invention will be better understood from the following theoretical analysis and detailed description taken in conjunction with the accompanying drawings in which, for the sake of clarity, concrete narrow terminology will be used; the invention, however, is not confined to the widely accepted terms alone, and it should be borne in mind that each term covers all the equivalent elements operating in a similar manner and which may be employed for attaining the same objectives as in the present described invention.

It should be further noted that the various objects and advntages of the present invention, other than mentioned earlier, will be appreciated from the following description and the drawings, wherein.

The principle of operation of an asynchronized-synchronous machine in accordance with the present invention will be better understood from a vector diagram of the stator of a machine on generator duty. Plotting on the abscissa $q^s$ (FIG. 5, the stator voltage vector, the stator e.m.f. vector $\overline{E}$ leads vector $\overline{U}$ by angle $\theta$; this e.m.f. being induced by the rotor current $\overline{I}_f$ leading the e.m.f. vector by $\pi/2$.

A drop in the voltage in the stator winding and in the transmission line is represented by a vector $jx\overline{I}$, where $\overline{I}$ is the stator current. The current vector $\overline{I}_f$ is resolved into components $I_{fq}$ and $I_{fd}$ directed along respective axes $q^s$ and $d^s$. Similarly the e.m.f. vector $\overline{E}$ may be resolved into components $E_d$ and $E_q$, it being clear that the e.m.f. $E_d$ is in proportion to the current $I_{fd}$ and lagging the current by $\pi/2$. The electromagnetic moment can be varied by varying the e.m.f. $E_q$, and here, in order to provide for the stability of operation, it is required that the e.m.f. $E_q$ should be in proportion to the instantaneous slip:

$$E_q = a_o + a_1 s,$$

12a.

where $a_o$ is a certain constant voltage setting which lends itself to continuous control.

The voltage:

$$E_d = b_o,$$

13a.

where $b_o$ is a certain constant voltage, voltage setting which lends itself to continuous control.

Figure 5:
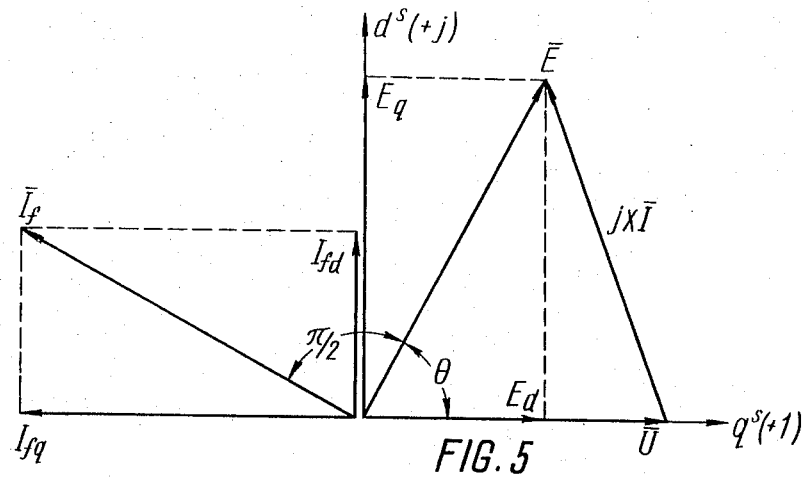
FIG. 5 is a vector diagram of the stator of a machine operating under generator-duty steady-state conditions.

In order to provide these conditions, as can be seen from FIG. 5, it is necessary and sufficient that the currents $I_{fq}$ and $I_{fd}$ should vary according to the following law:

$$I_{fq} = \alpha_o + \alpha_1 S \quad I_{fd} = \beta_o$$

14a.

Here $\alpha_o$, $\alpha_1$ and $\beta_o$ are control factors proportional respectively, to $a_o$, $a_1$ and $b_o$.

Figure 6:
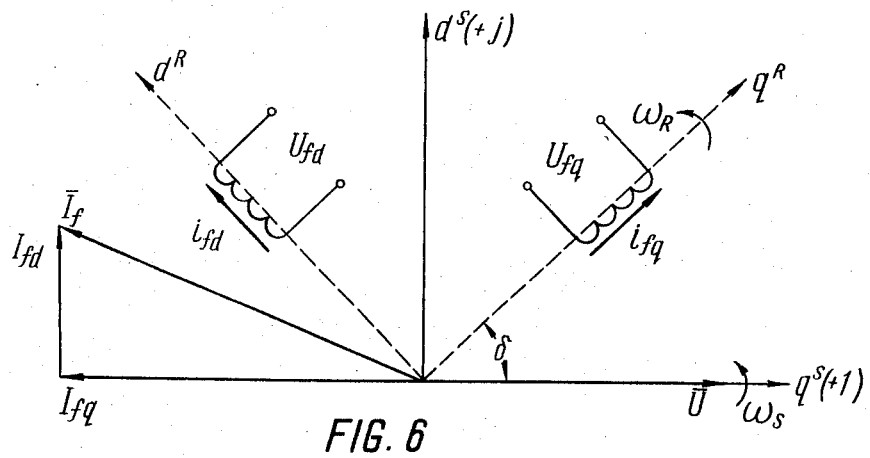
FIG. 6 is a vector diagram of a machine with a two-phase rotor.

A vector diagram is now slotted for a machine with a two-phase rotor, again containing vectors $\overline{I}_f$ and $\overline{U}$, components $I_{fq}$ and $I_{fd}$, as well as the axes of the rotor windings $d^R$ and $q^R$ rotating with respect to the axes $d^s q^s$ at a slip $S$, the angle $\delta = \int S\omega_s dt$ (FIG. 6).

In the same figure there is slotted the rotor windings, and the voltage current values of these windings $/U_{fq}^R$; $U_{fd}^R$; $i_{fq}$; $i_{fd}$.

It will be demonstrated hereinbelow that the method of control in accordance with the invention ensures variation of voltages $U_{fq}^R$ and $U_{fd}^R$ according to the following laws:

$$U_{fq}^R = [(I + K_q)(\alpha_o + \alpha_1 S) - K_q I_{fq}]\cos \delta - [(I + K_d)\beta_o - K_d I_{fd}] \sin \delta$$

15a.

$$U_{fd}^R = [(I + K_q)(\alpha_o + \alpha_1 S) - K_q I_{fq}]\sin\delta + [(I + K_d)\beta_o - K_d I_{fd}]\cos\delta.$$

Assuming that $K_q = K_d = K$, and plotting these relationships in a vector form, setting $\overline{U}_f^R = U_{fq}^R + j\overline{U}_{fd}^R$, where $U_f^R$ is the rotor voltage vector plotted in coordinates $d^R$; $q^R$, we obtain $$\overline{U}_f{}^R = [(I+K)(\alpha_o + \alpha_1 S) - KI_{fq}]e^{j\delta} + j[(I+K)\delta_o - KI_{fd}]e^{j\delta} ,$$

16a.

it follows that at sufficiently large values of factor $K$ $$I_{fq} \approx I + K/K \, (\alpha_o + \alpha_1 S) \approx \alpha_o + \alpha_1 S$$

$$I_{fd} \approx I + K/K \, \beta_o \approx \beta_o.$$

17a.

Thus, the method of this invention provides for an autonomous and invariable control of the stator e.m.f. projections $E_q$ and $E_d$. It can be shown that for a machine with a threephase rotor it is possible to obtain relationships coinciding 100 per cent with $\overline{U}_f{}^R$.

Discussed now is how the method of this invention provides for the stability of operation of a machine under both motor and generator duties. Plotting the relationship for $\overline{U}_f{}^R$ in the coordinates $d^sq^s$, for which purpose, in accordance with the known techniques, $\overline{U}_f{}^R$ is to be multiplied by $\epsilon^{-j\delta}$, and designating the rotor voltage vector plotted in the coordinates $d^sq^s$ by $\overline{U}_f$, it is ascertained that $$\overline{U}_f = \overline{U}_f{}^R \epsilon^{-j\delta} = (I+K)(\alpha_o + \alpha_1 S) - KI_{fq} + j(I+K)\beta_o - KI_{fd} = (I+K)[\alpha_o + \alpha_1 S + j\beta_o] - K\overline{I}_f.$$

18a.

From this it follows that in the $d^sq^s$ system of coordinates, the $I_{fq}$ and $I_{fd}$ feedback control has the same effect as would have a proportional negative feedback control with respect to the instantaneous rotor current.

The electromagnetic moment of a machine operating under steady-state conditions in accordance with the invention may be written $$M = \left(\frac{I}{x'} - \frac{I}{x}\right) \frac{\dfrac{S}{|S_{cr}|(I+K)}}{I + \dfrac{S^2}{S^2{}_{cr}(I+K)^2}} U^2 +$$

$$+ \frac{U(\alpha_o + \alpha_1 S) - \dfrac{S}{|S_{cr}|(I+K)} U\beta_o}{x\left[I + \dfrac{S^2}{S^2{}_{cr}(I+K)^2}\right]} = M_{AK} + M_t.$$

(19a)

Here $S_{cr}$ is the critical slip of the machine, $M_{AC}$ is the asynchronous motor torque with compensation, $I_f$ feedback effect, $M_f$ is an additional component due to voltages $\overline{U}$ and $\overline{U}_f$. Discussing first the stability of a machine operating in a "generalized synchronous" mode, in this case it is convenient, just as it has been done above, to represent $M_f$ in the form:

$$M_f = \frac{UE_f}{x\sqrt{I + \dfrac{S^2}{S^2{}_{cr}(I+K)^2}}} \sin \theta',$$

where (20a) 
$$\overline{E}_f = \sqrt{\frac{(\alpha_o + \alpha_1 S)^2 + \beta_o^2}{I + \dfrac{S^2}{S^2{}_{cr}(I+K)^2}}}$$

$E_f$ is the e.m.f. induced by voltage $\overline{U}_f$, and $\theta'$ is the angle between e.m.f. $E_f$ and voltage $\overline{U}$.

Suppose that $\alpha_1 = 0$. It is known that such a machine is evaluated for stability by analysing a characteristic equation.

$$Jp^2 + p \, \partial M_{AK}/\partial S + \partial M_f/\partial \theta' = 0.$$

21a.

The condition of stability $\partial M_f/\partial \theta > 0$ is analogous to the one considered above and leads to the known inequality:

$$-\pi/2 > \theta > \pi/2,$$

22a.

whereas the stability condition $\partial M_{AK}/\partial S > 0$ determining the limits of variation of stability may be written: $-|S_{cr}|(I+K) < S < |S_{cr}|(I+K)$.

23a.

However, then it becomes obvious that as $K$ increases, so does the range of stable slips, i.e., range of working slips of the machine, within which there will arise no undamped oscillations. More than that, such expansion of the stability range does not involve any deterioration of the efficiency or other characteristics of the machine performance. Analysis shows that at $\alpha_1 \neq 0$, the characteristic equation may be written in the following form:

(24a)
$$Jp^2 + p\left[\frac{\partial M_{AK}}{\partial S} + \alpha_1 \frac{Ux|p|}{\sqrt{I + \dfrac{S^2}{S^2{}_{cr}(I+K)^2}[p^2x^2 + (Qx + U^2)]}}\right] + \frac{\gamma M_f}{\gamma \theta'} = 0.$$

It means that at $\alpha_1 > 0$ the range of stability increases still more. In addition, at sufficiently large values of $K$, as can be seen from the torque equation given above, $\partial M_{AK}/\partial S \to 0$, then the degree of "stability with respect to spontaneous hunting" will depend entirely upon the magnitude of factor $\alpha_1$.

Accordingly the method of the present invention provides for a stable hunting-free operation of an asynchronized-synchronous machine in a "generalized synchronous" mode in any required range. This range is determined by the values of factors $K$ and $\alpha_1$.

Now let us discuss the problem of stability of a machine operating in a "generalized asynchronous" mode. The characteristic equation may be approximately written as $$Jp + (\partial M_{AK}/\partial S + \partial M_f/\partial S) = 0.$$

25a.

The stability condition will be $$\partial M/\partial S = \partial M_{AK}/\partial S + \partial M_f/\partial S > 0,$$

26a.

or (27a)
$$\frac{1}{|S_{cr}|(I+K)}\left[\frac{U^2}{x'}+Q\frac{S}{|S_{cr}|(I+K)}M\right]+\frac{\alpha_1 U}{x}>0.$$

Hence, the range of stability will increase with $\alpha_1$. This is true for any magnitude of the torque $M$, reactive power $Q$, slip $S$ and rotor current feedback factor.

Therefore, the method of the present invention permits an increase to any desired limits in the stability range of an asynchronized-synchronous machine operating in a "generalized asynchronous" mode, which range depends upon the relationship between $\alpha_1$ and $K$.

Thus, the present invention provides for a high degree of stability of an asynchronized-synchronous machine operating both in a "generalized synchronous" and "generalized asynchronous" mode.

Let us discuss now how the method of the invention provides for a high quality of the transients/deviation of parameters of an operating condition from the assigned values. First, a machine operating in a "generalized asynchronous" mode. Assuming that $K = \infty$, then from the torque formula we find:

$$M = U(\alpha_o + \alpha_1 S)/x.$$

28a.

The formula for the reactive power of the stator at a finite $K$ will be (29a)
$$Q = -\frac{I+\frac{S^2}{S^2_{cr}(I+K)^2}\frac{x'}{x}}{x\left[I+\frac{S^2}{S^2_{cr}(I+K)^2}\right]}U^2$$

$$+\frac{U\beta_o+\frac{S}{|S_{cr}|(I+K)}U(\alpha_o+\alpha_1 S)}{x\left[I+\frac{S^2}{S^2_{cr}(I+K)^2}\right]}$$

For $K = \infty$, $$Q = -U^2/x + U\beta_o/x.$$

30a.

From these formulas for $M$ and $Q$ at $K =\infty$, it can be seen that a variation $\beta_o$ will cause only the reactive power $Q$ to vary, with the slip remaining unaffected. One can also assert that as $\alpha_o$ varies, all other conditions being equal, only the slip $S$ will vary, with the reactive power $Q$ remaining unaffected. This, in fact, means that under such conditions of operation, overcontrol will be at a minimum.

Figure 1:
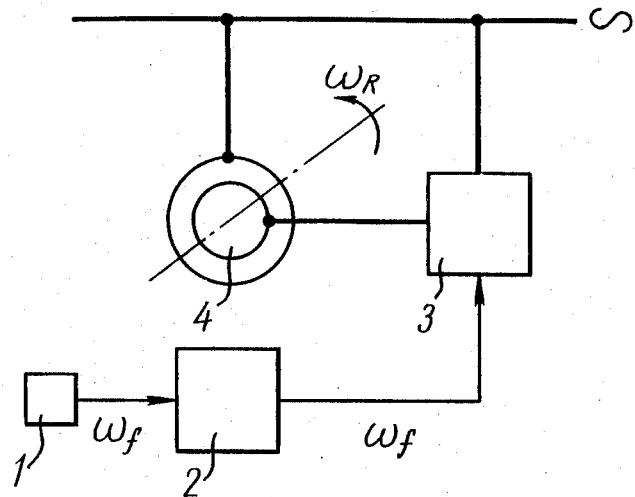
FIG. 1 is a block diagram of a control circuit of an asynchronized-synchronous machine operating in a "generalized synchronous" mode.
Figure 2:
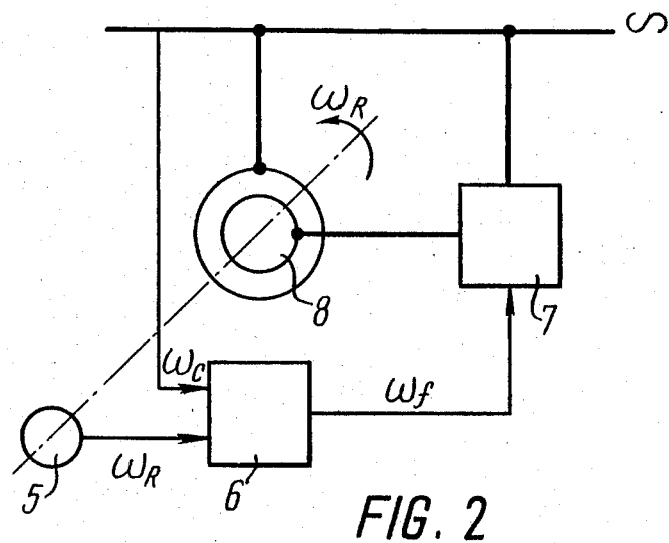
FIG. 2 is a block diagram of a control circuit of an asynchronized-synchronous machine operating in a "generalized asynchronous" mode.
Figure 3:
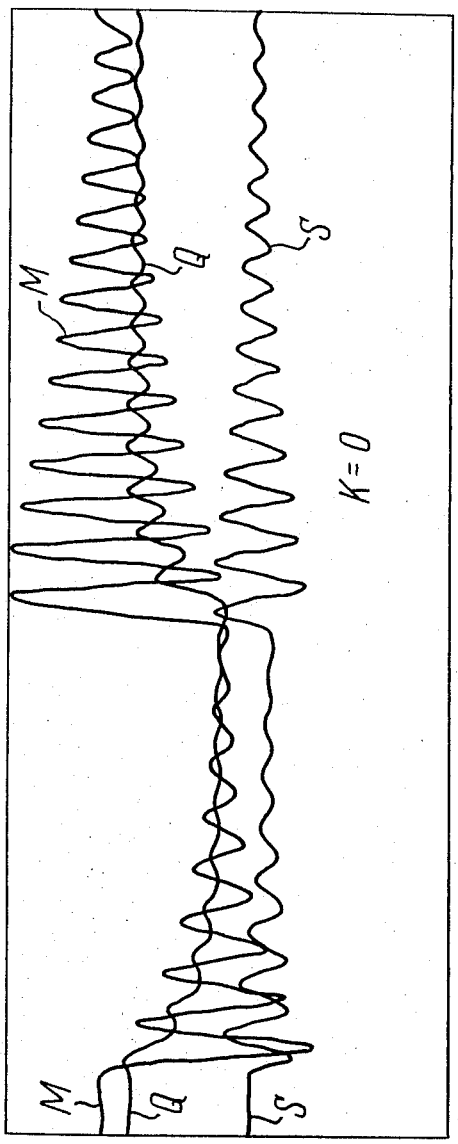
FIG. 3 is an oscillogram of the load-application and shedding transients of an asynchronized-synchronous motor controlled according to the prior art practice.
Figure 4:
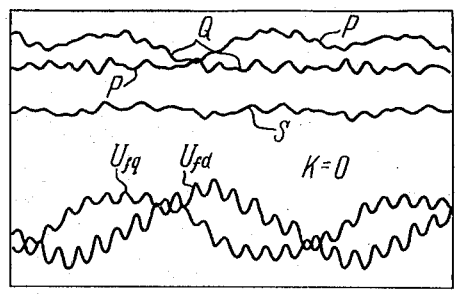
FIG. 4 is an oscillogram illustrating the operation of an asynchronized-synchronous motor controlled according to the prior art practice under conditions of asymmetry in the control channels.
Figure 7:
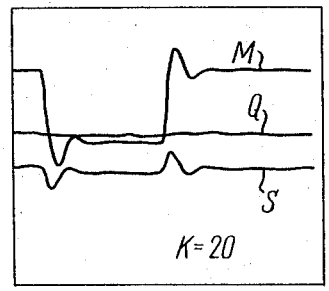
FIG. 7 is an oscillogram of the load-application and shedding transients of an asynchronized-synchronous machine controlled in accordance with the present invention.

Of course, at finite values of $K$, there remains a measure of reciprocity between $S$ and $Q$, but in practice, at finite but sufficient values of $K$, this intereffect is negligibly small. Thus, from the oscillogram of FIG. 7, recorded by an analog computer, it can be seen that during load application and shedding at an asynchronized-synchronous motor, the amount of overcontrol of the slip $S$, reactive power $Q$ and electromagnetic moment $M$ is small enough, $K=20$. Comparing this oscillogram with that of FIG. 3, one can see the effectiveness of the method of the present invention.

Figure 8:
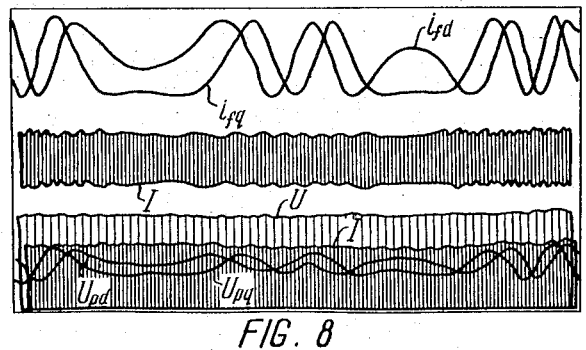
FIG. 8 is an oscillogram of the slip, current and voltage of a 50,000-kW generator.

FIG. 8 is an oscillogram of the slip, current and voltage of the stator of a 50,000-kW generator whose speed is varied by ±0.5 per cent. It can be seen that this amount of speed control entails practically no variation of the amplitudes of the stator current 1 and voltage U. Here the magnitude of factor $K$ is equal to 50; $i_{fq}$, $i_{fd}$ are the current components in the rotor winding of a machine on generator duty, −0.4 per cent $S ≤$ 0.4 per cent; $I_{s.g.}$ is the current through the generator stator supplying the rotor circuit of the asynchronized-synchronous machine; $U_{pq}$, $U_{pd}$ are the voltage components at the output of a means for controlling a frequency converter coupled into the rotor circuit.

Ascertained is now as to how the speed and stator e.m.f. vector variations due to asymmetry in the control channels are eliminated under steady-state conditions of operation.

It has been shown that the control method discussed permits varying the stator e.m.f. projections in an assigned manner, under any operating conditions and, still more importantly still, irrespective of whether the machine is connected to the power supply mains, disconnected from the mains or short-circuited. In a more general case as compared to the one obtained above, and at a sufficiently large K, the following condition is satisfied:

$$I_{fq} \cong \alpha_{ref}$$
$$I_{fd} \cong \beta_{ref}$$

31a.

where $\alpha_{ref}$ and $\beta_{ref}$ are, generally speaking, certain variables. However this means that the above relationships will be satisfied at sufficiently large values of $K$ no matter what kind of asymmetry there may be present in the control channels.

If this condition is satisfied, the currents in the rotor phases vary unambiguously.

Thus, for a two-phase rotor, according to FIG. 6 we find:

$$i_{fd} = I_{fd}\cos\delta - I_{fq}\sin\delta$$
$$i_{fq} = I_{fd}\sin\delta + I_{fq}\cos\delta$$

32a.

This means that for the relationships $I_{fq} = \alpha_{ref}$ and $I_{fd} = \beta_{ref}$ to be satisfied, currents $i_{fd}$ and $i_{fq}$ must vary according to the above formula.

Figure 9:
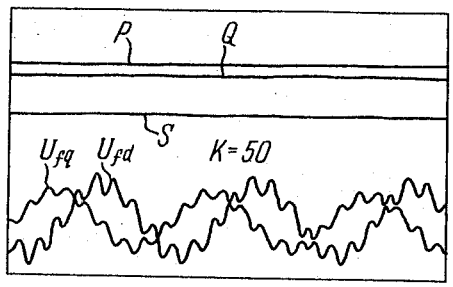
FIG. 9 is an oscillogram illustrating the operation of an asynchronized-synchronous motor controlled according to the present invention under conditions of asymmetry in the control channels.

FIG. 9 is an oscillogram recorded by an analog computer for a motor operating under load with asymmetry in the control channels, $U_{fd}$;$U_{fq}$, from which one can see that in spite of the asymmetry $K$=50 there are no variations of the active power $P$, reactive power $Q$ or the slip $S$ of the machine.

Figure 10B:
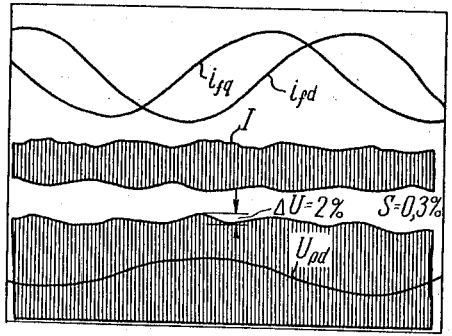
FIGS. 10a and 10b are oscillograms of the voltage across the terminals of a 50,090-kW generator shown controlled according to the prior art practice and also in accordance with the present invention.
Figure 10A:
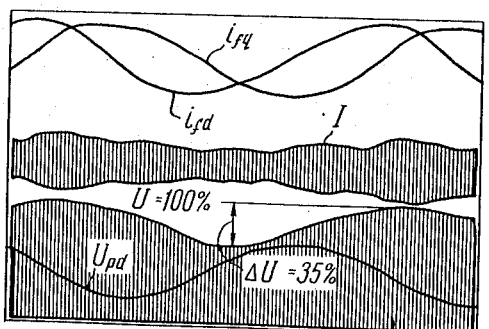

FIG. 10 a, b presents oscillograms of the voltage across the terminals of a generator controlled according to a prior method $a$ and according to the method of this invention $b$, from which it can be seen that while in the former case the variation of the voltage amplitude $U$ amounts to 30 per cent, in the latter case it is not more than 2 per cent.

The oscillograms were recorded at a slip $S = -0.2$ per cent.

Discussed now is the method and circuit for controlling an asynchronized-synchronous machine in accordance with the present invention.

Figure 11:
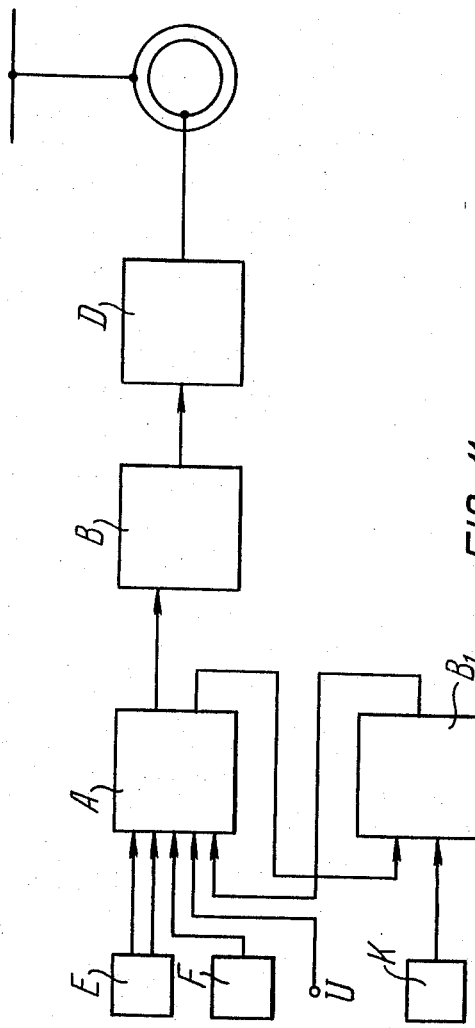
FIG. 11 is a block diagram of a control circuit for an asynchronized-synchronous machine in accordance with the present invention.

Mains signals U and signals from transmitter E (FIG. 11) proportional to the functions $\omega_R \cos\gamma : \omega_R \sin\gamma : \cos\gamma : \sin\gamma$, where $\omega_R$ is the instantaneous speed of rotation of the rotor and $\gamma$ is the angle of displacement of the rotor relative to the stator, are delivered to the input of functional unit A. $\omega_R$ and $\gamma$ form a relationship: $d\gamma/dt = \omega_R$. Also delivered to the input of functional unit A are constant-frequency signals from frequency-determining means F. From transducer K to the input of operational unit $B_1$ there are delivered signals proportional to the instantaneous rotor currents as well as the output signal of functional unit A, and the output of operational unit $B_1$ is fed to the input of functional unit A. The output of functional unit A is also fed to frequency converter control means D, after it has been formed in operational unit B.

Figure 12:
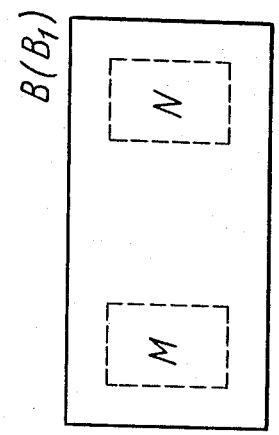
FIG. 12 is an electrical circuit diagram of functional unit A, and operational units B and $B_1$ of the control circuit.
Figure 12:
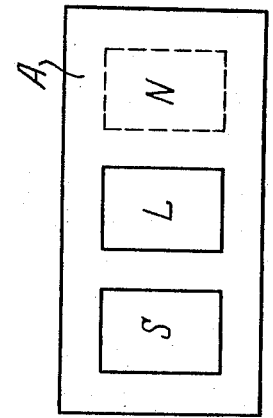

Functional unit A incorporates slip unit S and master control unit L, and may also comprise converters N (FIG. 12), while operational units $B_1$ and B may comprise either inverters M or converters N.

Figure 13:
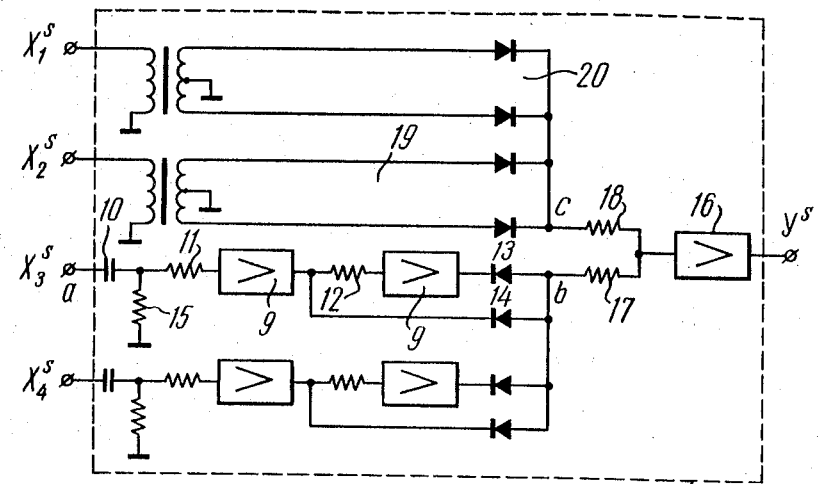
FIG. 13 is an electrical circuit diagram of slip unit S of the control circuit.

Unit S of FIG. 13 is built around known single-type amplifiers 9, described in: A. and T. Korn "Electronic and Hybrid Computers," New York, 1964, pp. 155–188, and is represented, just as the other units described hereinafter, in a unilinear form.

Unit S incorporates two strings ab, each of which comprises, in series, two operational amplifiers 9, a capacitor, 10, two resistors 11 and 12 and a rectifier 13, one of the resistors — 12 — decoupling two operational amplifiers 9, an additional rectifier 14 shunting the resistor 12, operational amplifier 9 and rectifier 13 connected in series with one another, and a resistor 15 with one earthed terminal is coupled between the plate of the capacitor 10 and the resistor 11.

Four rectifier anodes of the two strings ab are interconnected and coupled to the input of an operational amplifier 16 via a resistor 17.

Two single-phase full-wave rectifiers 19 and 20 are coupled via a resistor 18 to the same input of the operational amplifier 16.

Terminals $x_1^L : x_2^L : x_3^L$ and $x_4^L$ define the input of unit L, and terminal $y^L$ defines the output of this unit.

Unit L (FIG. 14) incorporates the above operational amplifiers, and also multiplier units 21 of the type described in: A. and T. Korn, "Electronic Analog and Hybrid Computers," New York, 1964, pp. 251–280.

Unit L comprises two series strings cd, each of which comprises two known operational amplifiers 9 and resistors 22 and 23, the resistor 23 decoupling two operational amplifiers 9, and also one string ef which differs from string cd by virtue of a serially coupled potentiometer 24.

Each operational amplifier 9 of strings cd and ef is connected by way of its output to the respective input of the multiplier units 21. The operational amplifiers 9 coupled at the end of each string cd in common with the resistors 23 are shunted by potentiometers whose sliders 25, 26, 27 and 28 are respectively coupled via resistors 29 and 30 to the inputs of two additional operational amplifiers 31 and 32, and the outputs of the respective multiplier units 21 are coupled to the same inputs of the additional amplifiers.

Potentiometers 33 and 34 are respectively coupled to the inputs of the very same two additional operational amplifiers.

Terminals $x_1^L : x_2^L : x_3^L : x_4^L : x_5^L$ form the inputs of unit L, and terminals $y_1^L : y_2^L$ form its output.

Unit M (FIG. 15) incorporates three groups, each comprising two earlier described strings cd, which by way of the outputs of their four operational amplifiers 9 are coupled to the inputs of three respective multiplier units 21, the latter's outputs being interconnected and coupled to the input of an additional operational amplifier 9. All units M, whatever their number in unit $B_1$ of FIG. 12 may be, on the side of the input are connected in parallel but have independent outputs. The inputs of the unit are formed by terminals $x_1^M : x_2^M : x_3^M : x_4^M : x_5^M : x_6^M$, and the output is formed by terminal $y^M$.

Unit N (FIG. 16) comprises two groups, two earlier described strings cd per group, which by way of the outputs of their four operational amplifiers 9 are coupled to the inputs of two respective multiplier units 21, their outputs being interconnected and coupled to the input of an additional operational amplifier 9. All units N, whatever their number in unit B of FIG. 12 may be, are connected in parallel on the side of the input, but have independent outputs.

The inputs of the unit are terminals $x_1^N : x_2^N : x_3^N : x_4^N$, and the output is formed by terminal $y^N$.

As asynchronized-synchronous machine 35 (FIG. 17) is connected by way of its stator winding 36 to a power supply mains and by way of its rotor winding 37 via a current transducer 39, K to the output of a frequency converter 38. The input of the frequency converter is connectible via a contactor 40 and a transformer 41 to the mains or to an alternator 42, whereof the shaft is rigidly connected with the shaft of the asynchronized-synchronous machine 35 and with the shaft of a prime mover, or load 43.

The shaft of the asynchronized-synchronous machine 35 is also rigidly connected with a synchronous tachometer generator 44 with two mutually perpendicular windings, which together with an integrator 45 define transmitter E. The integrator may be constructed according to the principle described in U.K. Pat. No. 1.170.191 granted to the present applicants.

The output of the tachometer generator 44 is coupled to the input of functional unit A and also to the input of the integrator 45, whereof the output is coupled via a switch 46 to the input of functional unit A. Instead of the integrator 45, the switch 46 can couple the input of functional unit A with a frequency-forming means 47 (F).

The output of the current transducer 39 (K) is coupled to the input of operational unit $B_1$, whereof the outputs and inputs are coupled to the input and output of functional unit A.

The input of functional unit A via a transformer 48 is coupled by way of a switch 49 to the mains or to a remote transmission output 50 of the voltage vector of a receiving system.

The output of functional unit A is coupled via operational unit B to a system of control for the frequency converter 38. Units A, B and $B_1$ form a means T for controlling the frequency converter.

Figure 17:
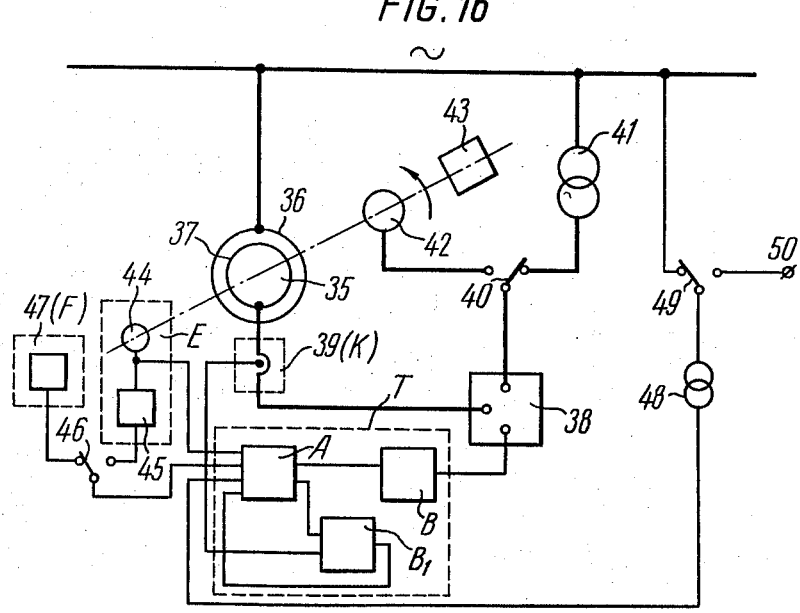
FIG. 17 is an electrical circuit diagram of an asynchronized-synchronous machine operating both in a "generalized synchronous" mode and in a "generalized asynchronous" mode, under both motor-duty and generator-duty conditions.

The circuit of FIG. 17 provides for the operation of the electrical machine 35 under both generator-duty and motorduty conditions, in either case both in a "generalized synchronous" and "generalized asynchronous" modes.

When the machine is required to operate in a "generalized synchronous" mode, the switch 46 is set to the lefthand position and the output of the frequency-forming means 47 is coupled to the input of functional unit A. If, on the other hand, it is required to ensure a "generalized asynchronous" mode of operation, then to switch 46 is set to the right-hand position and the output of the integrator 45 is coupled to the input of functional unit A.

On motor duty, the instrument transformer 48 is connected to the mains which is achieved by setting the switch 49 to the left-hand position, while on generator duty, the transformer 48 is connected to the remote transmission output of the voltage vector of the receiving system, for which purpose the switch 49 is to be set to the right-hand position.

Under motor-duty conditions, the circuit element 43 is a mechanism consuming mechanical energy, such as a load, while under generator-duty conditions, this element is a source of mechanical energy, for instance, a turbine.

If the electric parameters of the mains, of the transmitter E or of the frequency-forming means 47 are below standard and an asynchronized-synchronous machine with a two-phase rotor is required, then D.C. reference voltages are formed in functional unit A with a view to obviating speed and e.m.f. vector fluctuations.

For this case (FIG. 18), functional unit A incorporating units S and L as well as two units N, and two operational single-type units B each comprising two units N, define a means T for controlling the frequency converter 38 of FIG. 17. Six inputs of means T are coupled to the input of unit A; two outputs of unit A are coupled to the input of unit B, whereof two outputs are in their turn coupled to the input of said unit A. Besides, two inputs of said unit B are coupled to two inputs of means T.

Four outputs of unit A are coupled to the input of unit B, whereof the outputs form output terminals $U_{fd}$:$U_{fq}$ of means T for controlling the frequency converter 38.

The outputs of means T are terminals $z_1^{18}$ : $z_2^{18}$, coupled to the switch 46; $z_3^{18}$ : $z_4^{18}$, coupled to the outputs of the synchronous tachometer generator 44; $z_5^{18}$ : $z_6^{18}$, coupled to the transformer 48; and $z_7^{18}$ : $z_8^{18}$, coupled to the current transducer 39. The output of unit B is formed by terminals $U_{fd}$ : $U_{fq}$ of means T.

If the electric parameters of the mains are below standard the output signals of the transmitter or the frequency-forming means being satisfactory, and an asynchronized-synchronous machine is required, then reference voltages are formed at the frequency of rotation of the rotor.

For this case (FIG. 19) two identical operational units B, each incorporating two units N, and a functional unit A, built around units S and L, define a means T for controlling the frequency converter 38 (FIG. 17).

Four inputs of means T for controlling the frequency converter are coupled to the input of unit B (FIG. 19), whereof two outputs are connected to the input of unit A. Six inputs of means T are coupled to the input of unit B, the outputs thereof forming the output terminals of the means, which terminals are coupled to the input of the frequency converter. In addition, the input of this unit B is coupled to two inputs of means T.

The inputs of means T are formed by terminals $z_1^{19}$ : $Z_2^{19}$, coupled to the switch 46 (FIG. 17) $z_3^{19}$ : $z_4^{19}$, coupled to the input of the synchronous tachometer generator 44; $z_5^{19}$ : $z_6^{19}$, coupled to the transformer 48; and $z_7^{19}$ : $z_8^{19}$, coupled to the current transducer 39.

The output of unit B is formed by terminals $U_{fd}$:$U_{fq}$ of means T, the output terminals being coupled to the control circuit of the frequency converter 38.

If the electric parameters of the power supply mains are up to standard, and an asynchronized-synchronous machine with a two-phase rotor is required, then reference voltages are formed at the mains frequency.

For this case (FIG. 20) a functional unit A incorporating units S and L, and two identical operational units B, each of which comprises two units N, define a means T for controlling the frequency converter 38 (FIG. 17). Four inputs of means T are coupled to the input of unit B, whereof two outputs are coupled to the input of unit A, whereto four inputs of means T are also coupled, whereas two outputs of unit A are coupled to the input of unit B, the output thereof being defined by output terminals $U_{fd}$ : $U_{fq}$ of means T. Besides, the input of said unit B is coupled to two inputs of means T.

The inputs of means T are formed by terminals $z_1^{20}$ : $z_2^{20}$, coupled to the switch 46; $z_3^{20}$ : $z_4^{20}$, coupled to the output of the synchronous tachometer generator 44; $z_5^{20}$ : $z_6^{20}$, coupled to the current transducer 39; and $z_7^{20}$ : $z_8^{20}$, coupled to the transformer 48.

The output of unit B is formed by terminals $U_{fd}$ : $U_{fq}$ of means T.

If the electric parameters of the power supply mains, transmitter E and the frequency-forming means 47 are below standard and a machine with a three-phase rotor is required, then D.C. reference voltages are formed.

For this case (FIG. 21), an operational unit B incorporating three units N, an operational unit $B_1$ incorporating two units M, and a functional unit A comprising units S and L as well as six units N, form a means T for controlling the frequency converter 38 (FIG. 17).

Three inputs of means T (FIG. 21) are coupled to the input of operational unit $B_1$; ten inputs of means T are coupled to functional unit A; two outputs of unit $B_1$ are coupled to the input of functional unit A, whereof eight outputs are connected to operational unit B, and six outputs of unit A are coupled to the input of operational unit $B_1$.

the inputs of means T are formed by terminals: $z_1^{21}$ : $z_2^{21}$, coupled to the switch 46; $z_3^{21}$ : $z_4^{21}$, coupled to the output of the synchronous tachometer generator 44; $z_5^{21}$ : $z_6^{21}$ : $z_7^{21}$ : $z_8^{21}$ : $z_9^{21}$ : $z_{10}^{21}$, coupled to the transformer 48; and $z_{11}^{21}$ : $z_{12}^{21}$ : $z_{13}^{21}$, coupled to the current transducer 39.

The output of unit B is formed by output terminals $U_{fA}$ : $U_{fB}$ : $U_{fC}$ of means T.

If the electric parameters of the power supply mains are below standard, the output signals of the transmitter or of the frequency-forming means being satisfactory, and a three-phase machine is required, then reference voltages are formed at the frequency of rotation of the rotor.

For this case (FIG. 22), an operational unit B incorporating three units N, a functional unit A comprising units L and S, and an operational unit $B_1$ built around two units N, form a means T for controlling the frequency converter 38 (FIG. 17).

Six inputs of means T for controlling the frequency converter (FIG. 22) are coupled to the input of functional unit A; nine inputs of means T are coupled to the input of operational unit $B_1$; six inputs of means T are coupled to the input of operational unit B; two outputs of operational unit B are coupled to the input of functional unit A and the latter's two outputs are coupled to the input of operational unit B.

The inputs of means T are formed by terminals: $z_1^{22}$ : $z_2^{22}$, coupled to the switch 46; $z_3^{22}$ : $z_4^{22}$, coupled to the output of the synchronous tachometer generator 44; $z_5^{22}$ : $z_6^{22}$ : $z_7^{22}$ : $z_8^{22}$ : $z_9^{22}$ : $z_{10}^{22}$ coupled to the transformer 48; and $z_{11}^{22}$ : $z_{12}^{22}$ : $z_{13}^{22}$, coupled to the current transducer 39.

The output of unit B is formed by output terminals $U_{fA}$ : $U_{fB}$ : $U_{fC}$ of means T.

Discussed now is the principle of operation of the means of FIGS. 18, 19, 20, 21 and 22 and of the individual units making up the circuits of these means. For the sake of convenience, in all of the diagrams of the means and their units, the units and their component elements are continuously numbered (in brackets). Apart from this, each number given in brackets is accompanied by the description of the function of the unit bearing this number.

The inputs of any unit will be numbered in the order of their sequence from top to bottom: 1, 2, 3, . . . The outputs of units will be numbered in a like manner, provided they are more than one in number. If a unit has only one output, it will be assigned no number. The signals delivered to the output of any unit will be designated by the letter $x$ with a superscript and a subscript, the subscript denoting the number of the input of the unit, and the superscript denoting the number of the unit proper. Thus, the symbol $x_n^m$ will stand for the magnitude of a signal at the n-th input of unit $m$. The letter $y$ will designate the signal at the output of any unit. This letter will also be provided with a superscript and a subscript, so that the symbol $y_n^m$ will stand for a signal at the n-th output of unit $m$. The subscript will be omitted if there is only one output.

In order to describe the operation of the means 18, 19, 20, 21 and 22, it is, first of all, necessary to know the input-output functional relationships of the units making up these circuits, i.e. units S, L, M and N /FIGS. 13, 14, 15 and 16/, which is why these functional relationships will be given first, and then will follow the description of the operation of the units proper.

When dealing with the input-output functional relationships of units S, L, M and N, the numerical superscripts of the input $x$ and output $y$ quantities will be replaced, for the purposes of convenience, by the letters S, L, M and N corresponding to the functions performed by the unit in question.

The input-output relationship of slip unit S (FIG. 13) is described by the following equation: $y^S = \sqrt{(x_1^S)^2 + (x_2^S)^2} - \sqrt{(dx_3^S/dt)^2 + (dx_4^S/dt)^2}$.

1.

As noted above, $y^S$ stands for the slip $S$. It will be shown that equation 1 actually gives this value. The input-output functional relationships of unit L of FIG. 14, master control unit, are described by the following equations:

$$y_1^L = (I + K)(\alpha_o + \alpha_1 x_1^L)x_2^L - (I + K)\beta_o x_3^L + Kx_4^L,$$
$$y_2^L = (I + K)_o + \alpha_1 x_1^L)x_3^L + (I + K)\beta_o x_2^L + Kx_5^L,$$

2.

where factors $\alpha_o, \beta_o, K, \alpha_1$ are constant values, but may be varied as desired.

Such a unit may be modified so that its equations are written in the following form:

$$y_1^L = (I + K)(\alpha_o + \alpha_1 x_1^L)x_2^L + (I + K)\beta_o x_3^L + Kx_4^L,$$
$$y_2^L = -(I + K)(\alpha_o + \alpha_1 x_1^L)x_3^L + (I + K)\beta_o x_2^L + Kx_5^L.$$

3.

Inverters M are characterized by the following functional relationship:

$$y^M = (x_1^M x_2^M + x_3^M x_4^M + x_5^M x_6^M)\,\tfrac{2}{3}.$$

4.

This unit exists in no other modifications.

Figure 16:
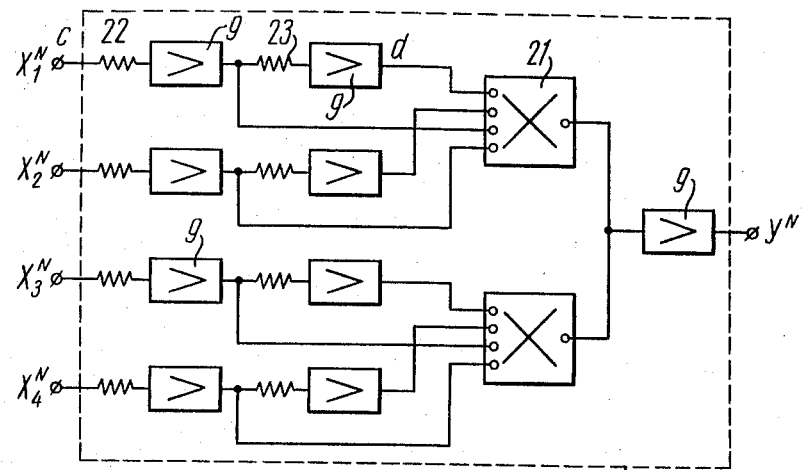
FIG. 16 is an electrical circuit diagram of converter N of the control circuit.

Finally, converter N of FIG. 16 has two modifications. Their functional relationships are respectively:

$$y^N = x_1^N x_2^N + x_3^N x_4^N$$

5.

and $$y^N = x_1^N x_2^N) - x_3^N x_4^N)$$

6.

Figure 18:
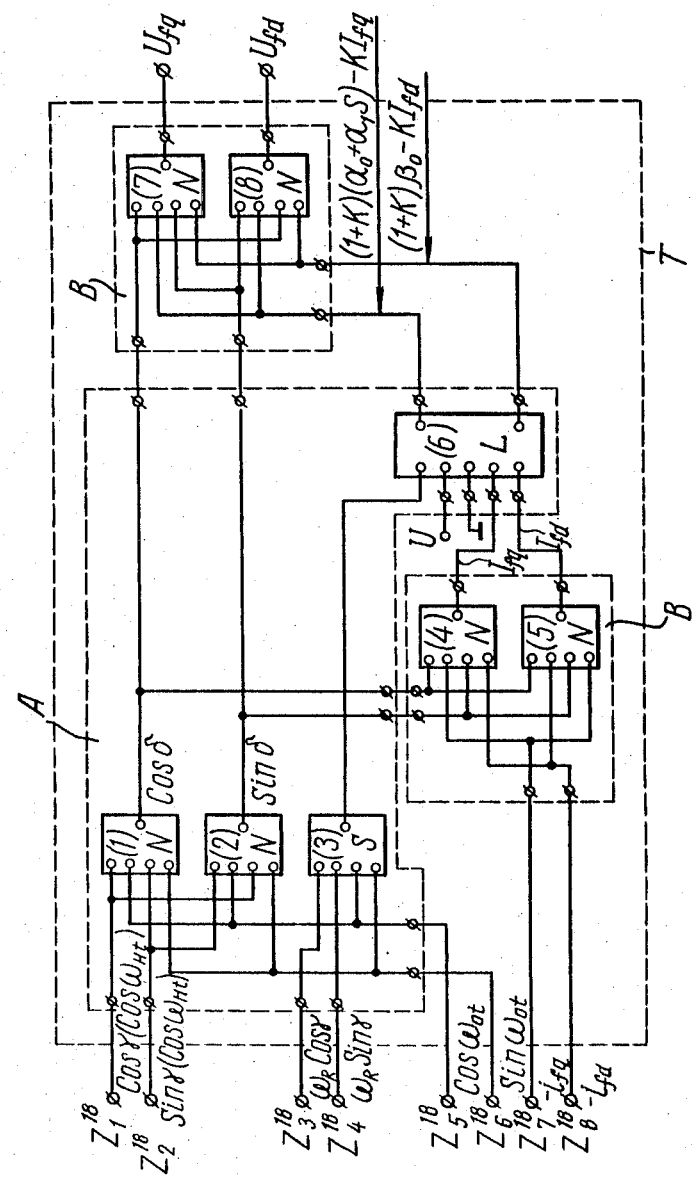
FIG. 18 is an electrical circuit diagram of means for controlling a machine with a two-phase rotor forming D.C. reference voltages.

Discussing now the functional relationships and the operation of means T of FIG. 18.

FIG. 18 contains the following designations: 1, 2, 4, 5, 7 and 8 — units N; 3 — unit S and 6 — unit L. The inputs of means T, according to the previous section of the description, are designated: $z_1^{18}, z_2^{18}, z_3^{18}, z_4^{18}, z_5^{18}, z_6^{18}, z_7^{18}$ and $z_8^{18}$; and its outputs are designated: $U_{fq}$ and $U_{fd}$.

According to FIG. 18, the output of the unit 1 is simultaneously delivered to the first inputs of the units 4, 5 and 7 and to the third input of the unit 8. Hence, the following relationships are formed:

$$x_1^4 = x_1^5 = x_1^7 = x_3^8 = y^1$$

7.

The output of the unit 2 is simultaneously fed to the third inputs of the units 4, 5 and 7 and to the first input of the unit 8, giving $$x_1^8 = x_3^4 = x_3^5 = x_3^7 = y^2.$$

8.

The output of the unit 3 is fed to the first input of the unit 6, or $$x_1^6 = y^3.$$

9.

The outputs of the units 4 and 5 are respectively fed to the fourth and fifth inputs of the unit 6. Consequently, $$x_4^6 = y^4,$$
$$x_5^6 = y^5.$$

10.

The first output of the unit 6 is simultaneously fed to the second inputs of the units 7 and 8, while the second output of the unit 6 is delivered to the fourth inputs of the units 7 and 8, giving $$x_2^7 = x_2^8 = y_1^6,$$
$$x_4^7 = x_4^8 = y_2^6.$$

11.

Signal $\cos\omega_o t$ from the voltage-measuring transfomer 48 is delivered to the second inputs of the units 1 and 2 and to the third input of the unit 3. Signal $\sin\omega_o t$ from this transfomer is fed to the fourth inputs of the units 1, 2 and 3. Hence, $$x_2^1 = x_2^2 = x_3^3 = \cos\omega_o t,$$
$$x_4^1 = x_4^2 = x_4^3 = \sin\omega_o t.$$

12.

Signal $\cos\gamma$ ($\cos\omega t$) fed from the integrator 45 in a "generalized asynchronous" mode or from the frequency-forming means 47 in a "generalized synchronous" mode, is simultaneously delivered to the first input of the unit 1 and to the third input of the unit 2. Similarly, signal $\sin\gamma$ ($\sin\omega t$) is fed to the first input of the unit 2 and to the third input of the unit 1. These relationships are expressed by the following equalities:
for the "generalized asynchronous" mode of operation:

$$x_1^1 = x_3^2 = \cos\gamma,$$
$$x_3^1 = x_1^2 = \sin\gamma;$$

13.

for the "generalized synchronous" mode of operation;

$$x_1^1 = x_3^2 = \cos\omega_H t,$$
$$x_3^1 = x_1^2 = \sin\omega_H t.$$

14.

The synchronous generator 44 delivers respective signals $\omega_p\cos\gamma$ and $\omega_p\sin\gamma$ to the first and second inputs of the unit 3, giving the following relationships:

$$x_1^3 = \omega_p\cos\gamma,$$
$$x_2^3 = \omega_p\sin\gamma.$$

15.

It has already been mentioned that the discussed frequency-determining means first forms D.C. reference voltages, which means that a positive constant reference voltage is fed to the second input of the unit 6, the third input of this unit being connected to ground. This corresponds to the equalities:

$$x_2^6 = 1, x_3^6 = 0.$$

16.

Signal $-i_{fq}$ from the transducer 39 is fed to the second input of the unit 4 and to the fourth input of the unit 5, while signal $-i_{fq}$ from the same transducer is delivered to the fourth input of the unit 4 and to the second input of the unit 5, which gives the following relationships:

$$x_2^4 = x_4^5 = -i_{fq},$$
$$x_4^4 = x_2^5 = -i_{fd}.$$

17.

The above relationships (b 1) — (17) permit determining the output signals of all the units for the system of FIG. 18. It will be additionally noted that the unit 6 obeys equation (3), the units 1, 4 and 8 obey equation (5), the units 2, 5 and 7 obey equation (6) and the unit 3 obeys equation (b 1).

Let us determine the output signals of the units for a "generalized asynchronous" mode of operation. According to relationships (12) and (13) and the equations for the units 1 and 2, we find:

$$y^1 = x_1^1 x_2^1 + x_3^1 x_4^1 = \cos\gamma \cos\omega_o t + \sin\gamma \sin\omega_o t = \cos(\gamma - \omega_o t) = \cos\delta,$$

$$y^2 = x_1^2 x_2^2 - x_3^2 x_4^2 = \sin\gamma \cos\omega_o t - \cos\gamma \sin\omega_o t = \sin(\gamma - \omega_o t) = \sin\delta.$$

18.

Taking into account relationships (7), (8) and (18), we find:

$$x_1^4 = x_1^5 = \cos\delta,$$
$$x_3^4 = x_3^5 = \sin\delta.$$

19.

From (17) and (19) bearing in mind that the unit 4 obeys equation (5) and the unit 5 obeys equation (6), we determine the output signals of these units:

$$y^4 = x_1^4 x_2^4 + x_3^4 x_4^4 = \cos\delta(-i_{fq}) + \sin\delta(-i_{fd}) = -(i_{fq}\cos\delta + i_{fd}\sin\delta) = -I_{fq},$$

$$y^5 = x_1^5 x_5^5 - x_3^5 x_4^5 = \cos\delta(-i_{fd}) - \sin\delta(-i_{fq}) = -(-i_{fq}\sin\delta + i_{fd}\cos\delta) = -I_{fd}.$$

20.

At the output of the unit 3, in accordance with relationships (1), (12) and (15), the following signal is generated:

$$y^5 = y^3 = \sqrt{(\omega_p\cos\gamma)^2 + (\omega_p\sin\gamma)^2} - \sqrt{(-\omega_o\sin\omega_o t)^2 + (\omega_o\cos\omega_o t)^2} = \omega_p - \omega_o.$$

21.

Relationships (9) and (10) and expressions (20) and (21) lead to the equalities:

$$x_1^6 = S;$$
$$x_2^6 = 1, x_3^6 = 0;$$
$$x_4^6 = -I_{fq}, x_5^6 = -I_{fd}.$$

22.

Since the unit 6 obeys equations (2), we easily find:

$$y_1^6 = (I + K)(\alpha_o + \alpha_1 x_1^6) x_2^6 - (I + K)\beta_o x_3^6 + K x_4^6 = (I + K)(\alpha_o + \alpha_1 S) - K I_{fq},$$

23.

$$y_2^6 = (I + K)(\alpha_o + \alpha_1 x_1^6) x_3^6 + (I + K)\beta_o x_2^6 + K x_5^6 = (I + K)\beta_o - K I_{fd}.$$

From equalities (7), (8) and (11) as well as relationships (18) and (23) we find:

$$x_1^7 = \cos\delta, x_2^7 = (I + K)(\alpha_o + \alpha_1 S) - K I_{fq},$$
$$x_3^7 = \sin\delta, x_4^7 = (I + K)\beta_o - K I_{fd},$$

24.

$$x_1^8 = \sin\delta, \; x_2^8 = (I + K)(\alpha_o + \delta_1 S) - KI_{fq},$$
$$x_3^8 = \cos\delta, \; x_4^8 = (I + K)\beta_o - KI_{fd}.$$

From (24) and from the condition that the unit 7 operates according to equation (6) and the unit 8 obeys equation (5), we determine the output signals of these units:

$$y^7 = x_1^7 x_2^7 - x_3^7 x_4^7 = \cos\delta[(I+K)(\alpha_o+\alpha_1 S) - KI_{fq}] - \sin\delta[(I+K)\beta_o - KI_{fd}],$$
$$y^8 = x_1^8 x_2^8 + x_3^8 x_4^8 = \sin\delta[(I+K)(\alpha_o+\alpha_1 S) - KI_{fq}] + \cos\delta[(I+K)\beta_o - KI_{fd}]. \qquad 25.$$

Signals (25) are precisely the output signals of means $T/U_{fq}$ and $U_{fd}$ respectively/, i.e.

$$U_{fq} = (I+K)(\alpha_o+\alpha_1 S)\cos\delta - (I+K)\beta_o\sin\delta - K(I_{fq}\cos\delta - I_{fd}\sin\delta),$$
$$U_{fd} = (I+K)(\alpha_o+\alpha_1 S)\sin\delta + (I+K)\beta_o\cos\delta - K(I_{fq}\sin\delta + I_{fd}\cos\delta). \qquad 26.$$

Substituting the expressions for $I_{fq}$ and $I_{fd}$ from (20) into formulas (26) it becomes clear that the method of this invention does actually conduce to the required law of control:

$$U_{fq} = (I+K)(\alpha_o + \alpha_1 S)\cos\delta - (I+K)\beta_o \sin\delta - Ki_{fq},$$
$$U_{fd} = (I+K)(\alpha_o + \alpha_1 S)\sin\delta + (I+K)\beta_o \cos\delta - Ki_{fq}, \qquad 28.$$

We have considered a method of forming the law of control ensuring the operation of the machine 35 in a "generalized asynchronous" mode.

As for the "generalized synchronous" mode of operation, in all the above expressions one must obviously substitute $\cos\omega_H t$ and $\sin\omega_H t$ for $\cos\gamma$ and $\sin\gamma$ respectively. Then at the outputs of the units 1 and 2 the following signals will be formed:

$$y^1 = \cos(\omega_H t - \omega_o t) = \cos\nu t,$$
$$y^2 = \sin(\omega_H t - \omega_o t) = \sin\nu t, \qquad 28.$$

where $\nu = \omega_H - \omega_o$. Consequently, on the basis of (27), the following control signals will be formed at the output of means T:

$$U_{fq} = (I+K)(\alpha_o+\alpha_1 S)\cos\nu t - (I+K)\beta_o\sin\nu t - Ki_{fq},$$
$$U_{fd} = (I+K)(\alpha_o+\alpha_1 S)\sin\nu t + (I+K)\beta_o\cos\nu t + Ki_{fq}, \qquad 29.$$

Figure 19:
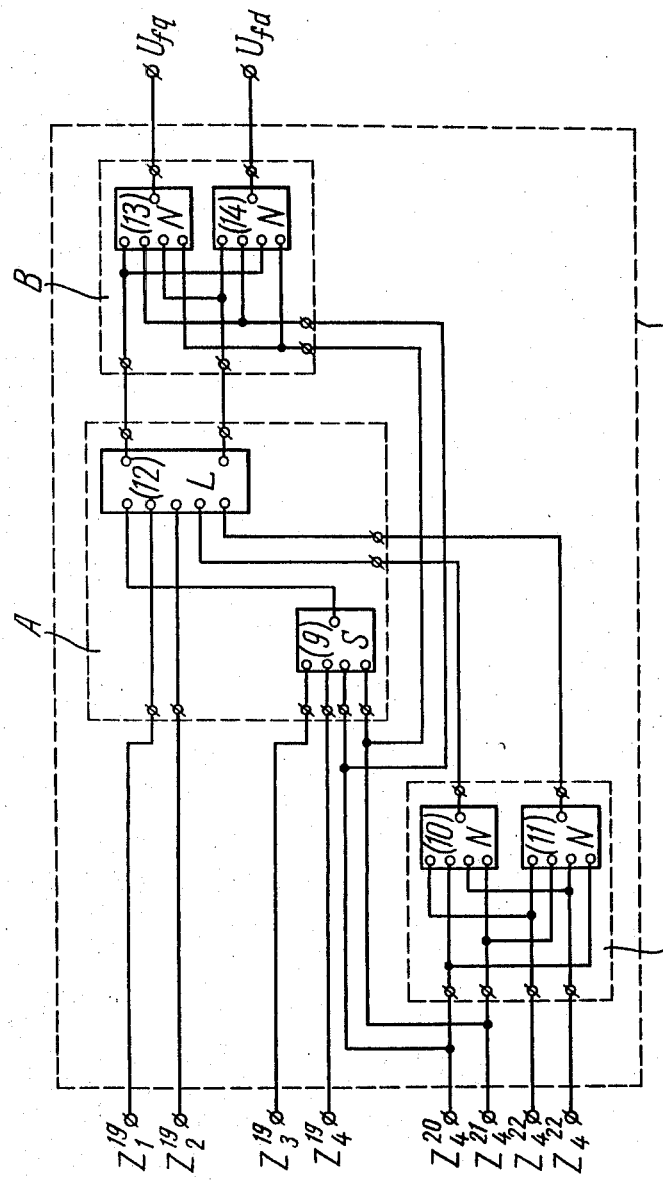
FIG. 19 is an electrical circuit diagram of means for controlling a machine with a two-phase rotor forming reference voltages at the frequency of rotor rotation.

FIG. 19 is a diagram of means T forming reference control voltages at a frequency $\omega_p$, in a system of coordinates rotating relative to the field of the machine at a speed equal to $\omega_o - \omega_p$, for the case of a two-phase rotor. FIG. 19 contains the following designations:
9 — slip units S; 10, 11, 13 and 14 — converters N and 12 — master control unit L.

The input-output functional relationships of the units of this circuit are such that the units 10 and 14 are described by equation (6); the units 11 and 13 are described bed by equation (5); and the unit 9 is described by equation (1).

Let us discuss the functional relationships in the circuit of FIG. 19.

Information from the instrument transformer 48 is delivered in the form of signal $\cos\omega_o t$ to the second inputs of the units 10, 13 and 14; to the third input of the unit 9 and to the fourth input of the unit 11, and in the form of signal $\sin\omega_o t$ to the fourth inputs of the units 9, 10, 13 and 14 and to the second input of the unit 11. These relationships are expressed by the equalities:

$$x_2^{10} = x_2^{13} = x_2^{14} = x_3^9 = x_4^{11} = \cos\omega_o t,$$
$$x_4^9 = x_4^{10} = x_4^{13} = x_4^{14} = x_2^{11} = \sin\omega_o t. \qquad 30.$$

The synchronous tachometer generator 44 delivers respective signals $\omega_p \cos\gamma$ and $\omega_p \sin\gamma$ to the first and second inputs of the units 9, i.e.

$$x_1^9 = \omega_p \cos\gamma, \; x_2^9 = \omega_p \sin\gamma. \qquad 31.$$

From the current transducer signal $-i_{fq}$ is fed to the first inputs of the units 10, and 11, and signal $-i_{fd}$ is fed to the third inputs of the same units, forming the relationships:

$$x_1^{10} = x_1^{11} = -i_{fq},$$
$$x_3^{10} = x_3^{11} = -i_{fd}. \qquad 32.$$

From the integrator 45, or the frequency-forming means 47, signals $\cos\gamma$ ($\cos\omega_H t$) and $\sin\gamma$ ($\sin\omega_H t$) are respectively delivered to the second and third inputs of the unit 12. The signals from the units 9, 10 and 11 are fed respectively to the first, fourth and fifth inputs of the unit 12. The resultant equalities are $$x_2^{12} = \cos\gamma(\cos\omega_H t),$$
$$x_3^{12} = \sin\gamma(\sin\omega_H t),$$
$$x_1^{12} = y^9,$$
$$x_4^{12} = y^{10}, \; x_5^{12} = y^{11}. \qquad 33.$$

From the previous circuit (FIG. 18) it is clear that the quantities in brackets are used for the "generalized synchronous" mode of operation of the machine 35.

Finally, the signal from the first output of the unit 12 is delivered to the first input of the unit 13 and to the third input of the unit 14, while the second output of the unit 12 is fed to the first input of the unit 14 and to the third input of the unit 13:

$$x_1^{13} = x_3^{14} = y_1^{12},$$
$$x_3^{13} = x_1^{14} = y_2^{12}. \qquad 34.$$

Thus, all the relationships have been considered.

Let us see now how the law of control is formed in the circuit. The same signals and in the same sequence are fed to the inputs of the unit 9 as to the unit performing the same function, slip signal generation, in the previous circuit (FIG. 18). Therefore, without using equation (1), we may write immediately:

$$y^9 = S. \qquad 35.$$

According to (30) and (32) and bearing in mind that the units 10 and 11 obey the earlier specified equations, the output signals of these units will be:

$$y^{10} = x_1^{10} x_2^{10} - x_3^{10} x_4^{10} = (-i_{fq})\cos\omega_o t - (i_{fd})\sin\omega_o t = -(i_{fq}\cos\omega_o t + i_{fd}\sin\omega_o t) = -I_{fq}^R, \qquad 36.$$
$$y^{11} = x_1^{11} x_2^{11} + x_3^{11} x_4^{11} = (-i_{fq})\sin\omega_o t + (-i_{fd})\cos\omega_o t = -(i_{fq}\sin\omega_o t + i_{fd}\cos\omega_o t) = -I_{fd}^R.$$

Then, from (33), (35) and (36) it follows that, for the asynchronous mode of operation $$x_1^{12} = S, \ x_2^{12} = \cos\gamma, \ x_3^{12} = \sin\gamma, \ x_4^{12} = -I_{fq}^R, \ x_5^{12} = -I_{fd}^R. \quad 37.$$

Therefore, the output signals generated by the unit 12 will be:

$$y_1^{12} = (1+K)(\alpha_o + \alpha_1 x_1^{12})x_2^{12} - (1+K)\beta_o x_3^{12} + Kx_4^{12}$$
$$= (1+K)(\alpha_o + \alpha_1 S)\cos\gamma - (1+K)\beta_o \sin\gamma - KI_{fq}^R$$
$$y_2^{12} = (1+K)(\alpha_o + \alpha_1 x_1^{12})x_3^{12} + (1+K)\beta_o x_2^{12} + Kx_5^{12}$$
$$= (1+K)(\alpha_o + \alpha_1 S)\sin\gamma + (1+K)\beta_o \cos\gamma - KI_{fd}^R. \quad 38.$$

On the basis of (30), (34) and (38), the inputs of the units 13 and 14 will be:

$$x_3^{14} = x_1^{13} = (1+K)(\alpha_o + \alpha_1 S)\cos\gamma - (1+K)\beta_o \sin\gamma - KI_{fq}^R,$$

$$x_2^{13} = \cos\omega_o t = x_2^{14},$$

$$\quad 39.$$

$$x_1^{14} = x_3^{13} = (1+K)(\alpha_o + \alpha_1 S)\sin\gamma - (1+K)\beta_o \cos\gamma - KI_{fd}^R,$$

$$x_4^{13} = \sin\omega_o t = x_4^{14}.$$

The outputs of the units 13 and 14, according to the equations for these units, will be:

$$y^{13} = x_1^{13}x_2^{13} + x_3^{13}x_4^{13} = [(1+K)(\alpha_o + \alpha_1 S)\cos\gamma - (1+K)\beta_o \sin\gamma - KI_{fq}^R]\cos\omega_o t + [(1+K)(\alpha_o + \alpha_1 S)\sin\gamma + (1+K)\beta_o \cos\gamma - KI_{fd}^R]\sin\omega_o t = (1+K)(\alpha_o + \alpha_1 S)\cos(\gamma - \omega_o t) - (1+K)\beta_o \sin(\gamma - \omega_o t) - K(I_{fq}^R \cos\omega_o t + I_{fd}^R \sin\omega_o t), \quad 40.$$

$$y^{14} = x_1^{14}x_2^{14} - x_3^{14}x_4^{14} = [(1+K)(\alpha_o + \alpha_1 S)\sin\gamma + (1+K)\beta_o \cos\gamma - KI_{fd}^R]\cos\omega_o t - [(1+K)(\alpha_o + \alpha_1 S)\cos\gamma - (1+K)\gamma_o \sin\gamma - KI_{fq}^R]\sin\omega_o t = (1+K)(\alpha_o + \alpha_1 S)\sin(\gamma - \omega_o t) + (1+K)\beta_o \cos(\gamma - \omega_o t) - K(-I_{fq}^R \sin\omega_o t + I_{fd}^R \cos\omega_o t).$$

Bearing in mind that signals $y^{13}$ and $y^{14}$ must correspond to the composite control signals $U_{fq}$ and $U_{fd}$ being formed, and also that $\gamma - \omega_o t = \delta$, we write:

$$U_{fq} = (1+K)(\alpha_o + \alpha_1 S)\cos\delta - (1+K)\beta_o \sin\delta - K(I_{fq}^R \cos\omega_o t + I_{fd}^R \sin\omega_o t), \quad 41.$$

$$U_{fd} = (1+K)(\alpha_o + \alpha_1 S)\sin\delta + (1+K)\beta_o \cos\delta - K(-I_{fq}^R \sin\omega_o t + I_{fd}^R \cos\omega_o t).$$

The first terms of law (41) are fully in accordance with the required control law, i.e., they coincide with the terms of law (27). In order to make sure that in this case, too, the control law has been correctly formed, it must be shown that the last two terms of (41) are the quantities $i_{fq}$ and $i_{fd}$ respectively. Using for the purpose expressions (36) for $I_{fq}^R$ and $I_{fd}^R$, we indeed find:

$$I_{fq}^R \cos\omega_o t + I_{fd}^R \sin\omega_o t = (i_{fq}\cos\omega_o t - i_{fd}\sin\omega_o t)\cos\omega_o t + (i_{fq}\sin\omega_o t + i_{fd}\cos\omega_o t)\sin\omega_o t = i_{fq}(\cos^2\omega_o t + \sin^2\omega_o t) + i_{fq}, \quad 42.$$

$$-I_{fq}^R \sin\omega_o t + I_{fd}^R \cos\omega_o t = -(i_{fq}\cos\omega_o t - i_{fd}\sin\omega_o t)\sin\omega_o t + (i_{fq}\sin\omega_o t + i_{fd}\cos\omega_o t)\cos\omega_o t = i_{fd}(\sin^2\omega_o t + \cos^2\omega_o t) = i_{fd}.$$

So the law has been formed correctly. Substituting $\nu t$ for $\delta$, we shall obtain the control law for the "generalized synchronous" mode of operation.

Figure 20:
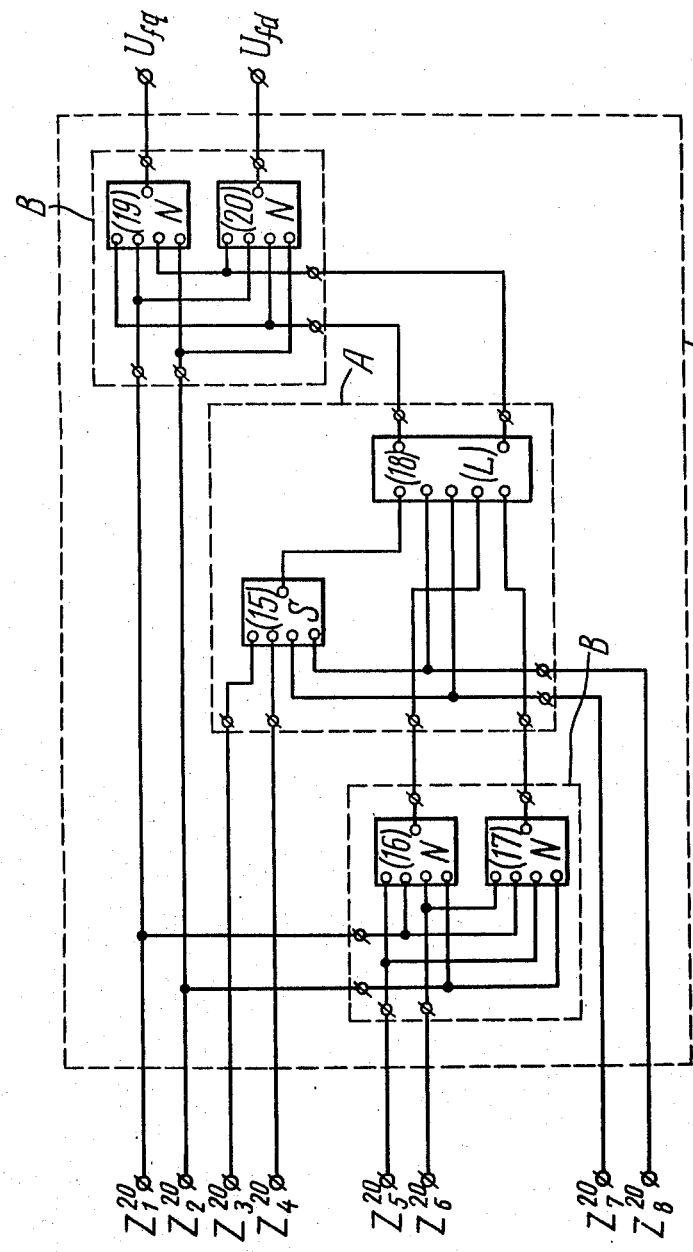
FIG. 20 is an elelctrical circuit diagram of means for controlling a machine with a two-phase rotor forming reference voltages at the power supply mains frequency.

Now let us consider the functional relationships and the principle of operation of means T of FIG. 20.

FIG. 20 is a circuit of means T for forming reference control voltages first at a frequency $\omega_o$, in a system of coordinates which is stationary relative to the machine stator, for the case of a two-phase rotor. FIG. 20 contains the following designations:

15 — slip unit S; 16, 17, 19 and 20 — converters N and 18 — master control unit L.

In this schematic diagram, the units 16 and 20 obey equation (5); the units 17 and 19 obey equation (6) and the unit 18 obeys equation (3).

The functional relationships of the unit 15 with the transducer, transmitter the unit 18 are the same as in the previous diagrams FIGS. 18 and 19, which enables us to write at once:

$$x_1^{18} = y^{15} = S. \quad 43.$$

Since from the detailed description of the previous schematic diagrams it has become absolutely clear how to describe the functional relationships between individual elements (units), all verbal explanations will be hereinafter omitted, with the relationships described in purely mathematical terms.

The discussed schematic diagram features functional relationships relating to:

the inputs of the unit 16:

$$x_1^{16} = -i_{fq}, \ x_2^{16} = \cos\gamma \ (\cos\omega_H t),$$
$$x_3^{16} = -i_{fd}, \ x_4^{16} = \sin\gamma \ (\sin\omega_H t); \quad 44.$$

the inputs of the unit 17:

$$x_1^{17} = -i_{fd}, \ x_2^{17} = \cos\gamma \ (\cos\omega_H t),$$
$$x_3^{17} = -i_{fq}, \ x_4^{17} = \sin\gamma \ (\sin\omega_H t); \quad 45.$$

the inputs of the unit 18:

$$x_1^{18} = y^{15} = S, \ x_2^{18} = \cos\omega_o t,$$
$$x_3^{18} = \sin\omega_o t, \ x_4^{18} = y^{16}, \ x_5^{18} = y^{17}; \quad 46.$$

the inputs of the unit 19:

$$x_1^{19} = y_1^{18}, \ x_2^{19} = \cos\gamma \ (\cos\omega_H t),$$
$$x_3^{19} = y_2^{18}, \ x_4^{19} = \sin\gamma \ (\sin\omega_H t); \quad 47.$$

the inputs of the unit 20:

$$x_1^{20} = y_2^{18}, \ x_2^{20} = \cos\gamma \ (\cos\omega_H t),$$
$$x_3^{20} = y_1^{18}, \ x_4^{20} = \sin\gamma \ (\sin\omega_H t); \quad 48.$$

the outputs of the units 19 and 20:

$$y^{19} = U_{fq}, \ y^{20} = U_{fd}. \quad 49.$$

The units 16 and 17 generate the signals:

$$y^{16} = x_1^{16}x_2^{16} + x_3^{16}x_4^{16} = (-i_{fq})\cos\gamma + (-i_{fd})\sin\gamma = -(i_{fq}\cos\gamma + i_{fd}\sin\gamma) = -I_{fq}^U, \quad 50.$$

$$y^{17} = x_1^{17}x_2^{17} - x_3^{17}x_4^{17} = (-i_{fd})\cos\gamma - (-i_{fq})\sin\gamma = -(i_{fd}\sin\gamma + i_{fd}\cos\gamma) = I_{fd}^U.$$

The unit 18, in this case described by equation (3) generates the signals:

$y_1^{18} = (I+K)(\alpha_o + \alpha_1 x_1^{18})x_2^{18} + (I+K)\beta_o x_3^{18} + Kx_4^{18}$
$= (I+K)(\alpha_o + \alpha_1 S)\cos\omega_o t + (I+K)\beta_o \sin\omega_o t - KI_{fq}^U,$  51.

$y_2^{18} = -(I+K)(\alpha_o + \alpha_1 x_1^{18})x_3^{18} + (I+K)\beta_o x_2^{18} + Kx_5^{18} = -(I+K)(\alpha_o + \alpha_1 S)\sin\omega_o t + (I+K)\beta_o \cos\omega_o t - KI_{fd}^U.$ The units 19 and 20 generate the final control signals:
$y^{19} = x_1^{19} x_2^{19} - x_3^{19} x_4^{19} = y_1^{18}\cos\gamma - y_2^{18}\sin\gamma,$
$y^{20} = x_1^{20} x_2^{20} + x_3^{20} x_4^{20} = y_2^{18}\cos\gamma + y_1^{18}\sin\gamma.$  52.

Taking into account (49) and (51), we obtain:
$U_{fq} = [(I+K)(\alpha_o + \alpha_1 S)\cos\omega_o t + (I+K)\beta_o \sin\omega_o t - KI_{fq}^U]\cos\gamma - [-(I+K)(\alpha_o + \alpha_1 S)\sin\omega_o t + (I+K)\beta_o \cos\omega_o t - KI_{fd}^U]\sin\gamma = (I+K)(\alpha_o + \alpha_1 S)\cos(\gamma - \omega_o t) - (I+K)\beta_o \sin(\gamma - \omega_o t) - K(I_{fq}^U \cos\gamma - I_{fd}^U \sin\gamma),$  53.

$U_{fd} = [-(I+K)(\alpha_o + \alpha_1 S)\sin\omega_o t + (I+K)\beta_o \cos\omega_o t - KI_{fd}^U]\cos\gamma + [(I+K)(\alpha_o + \alpha_1 S)\cos\omega_o t + (I+K)\beta_o \sin\omega_o t - KI_{fq}^U]\sin\gamma = (I+K)(\alpha_o + \alpha_1 S)\sin(\gamma - \omega_o t) + (I+K)\beta_o \cos(\gamma - \omega_o t) - K(I_{fq}^U \sin\gamma + I_{fd}^U \cos\gamma).$ And in the final form:
$U_{fq} = (I+K)(\alpha_o + \alpha_1 S)\cos\delta - (I+K)\beta_o \sin\delta - K(I_{fq}^U \cos\gamma - I_{fd}^U \sin\gamma),$  54.
$U_{fd} = (I+K)(\alpha_o + \alpha_1 S)\sin\delta + (I+K)\beta_o \cos\delta - K(I_{fq}^U \sin\gamma + I_{fd}^U \cos\gamma).$ Substituting in (54) the expressions for $I_{fq}^U$ and $I_{fd}^U$ from (50), it will be seen that the last two terms of (50) given in brackets are respectively equal to $i_{fq}$ and $i_{fd}$, i.e., means T correctly forms the required control law. Substituting $vt$ for $\delta$, we shall obtain the law for the "generalized synchronous" mode of operation.

Figure 21:
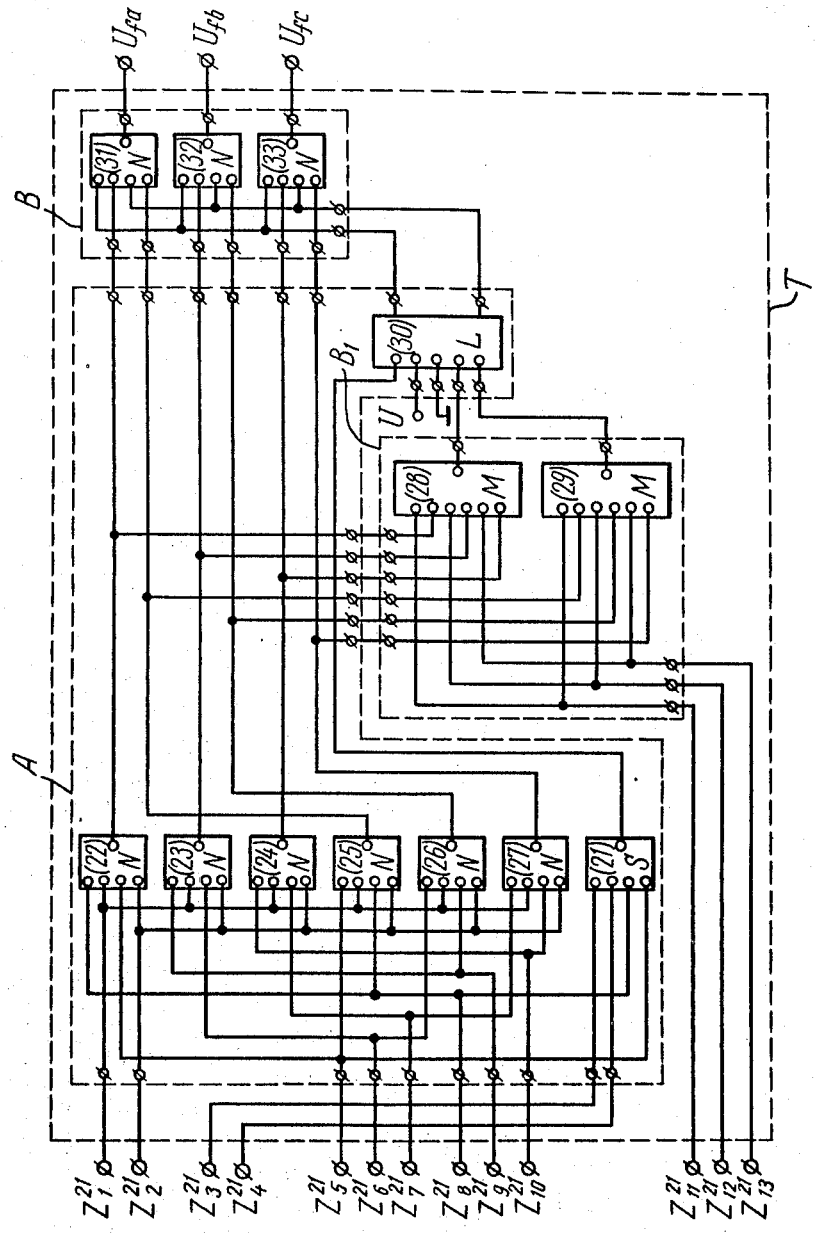
FIG. 21 is an electrical circuit diagram of means for controlling a machine with a three-phase rotor forming D.C. reference voltages.

Let us consider the functional relationships and the principle of operation of means T of FIG. 21.

FIG. 21 is a circuit diagram of a means T for forming D.C. reference control voltages for the case of a three-phase rotor. The figure contains the following designations 21 — slip unit S; 22, 23, 24, 25, 20 and 27 — converters N; 31, 32, 33, 28 and 29 — inverters M; and 30 — master control unit L.

As compared with the earlier discussed diagrams, this one features three peculiarities: (a) all the six signals of the instrument transformer 48, $\cos\omega_o t$, $\cos(\omega_o t + 120°)$, $\cos(\omega_o t + 240°)$, $\sin\omega_o t$, $\sin(\omega_o t + 120°)$ and $\sin(\omega_o t + 240°)$, are utilized; (b) the circuit employs a three-phase transducer of instantaneous rotor currents generating three signals: $i_{fa}$, $i_{fb}$ and $i_{fc}$; and finally (c) the circuit employs a new element — an inverter.

The input-output functional relationships of the units are described by equation (5) for the units 22, 23, 24, 31, 32 and 33; by equation (6) for the units 25, 26 and 27; by equation (2) for the unit 30; and by equation (4) for the units 28 and 29.

Let us describe the functional relationships in the circuit.

For the units 21 and 30 we can immediately write:

$$x_1^{30} = y^{21} = S.$$  55.

For the units 22–27:
$x_1^{22} = x_3^{25} = \cos\omega_o t, \ x_1^{23} = x_3^{26} = \cos(\omega_o t + 120°),$
$x_1^{24} = x_3^{27} = \cos(\omega_o t + 240°), \ x_3^{22} = x_1^{25} = \sin\omega_o t,$
$x_3^{23} = x_1^{26} = \sin(\omega_o t + 120°), \ x_3^{24} = x_1^{27} = \sin(\omega_o t + 240°),$ $x_2^{22} = x_2^{23} = x_2^{24} = x_2^{25} = x_2^{26} = x_2^{27} = \cos\gamma(\cos\omega_H t)$
$x_4^{22} = x_4^{23} = x_4^{24} = x_4^{25} = x_4^{26} = x_4^{27} = \sin\gamma(\sin\omega_H t).$  56.

The relationships for the units 28 and 29 are:
$x_1^{28} = x_1^{29} = -i_{fa}, \ x_3^{28} = x_3^{29} = -i_{fb}, \ x_5^{28} = x_5^{29} = -i_{fc},$
$x_2^{28} = y^{22}, \ x_4^{28} = y^{23}, \ x_6^{28} = y^{24}, \ x_2^{29} = y^{25},$
$x_4^{29} = y^{26}, \ x_6^{29} = y^{27}.$  57.

The input relationships of the unit 30 are described by the following equations, bearing in mind that in this circuit the unit 30 forms D.C. reference control voltages $x_2^{30} = 1, \ x_3^{30} = 0, \ x_4^{30} = y^{28}, \ x_5^{30} = y^{29}.$  58.

The relationships for the units 31, 32 and 33 are as follows:
$x_1^{31} = x_1^{32} = x_1^{33} = y_1^{30}, \ x_3^{31} = x_3^{32} = x_3^{33} = y_2^{30},$
$x_2^{31} = y^{22}, \ x_4^{31} = y^{25}, \ x_2^{32} = y^{23}, \ x_4^{32} = y^{26},$
$x_2^{33} = y^{24}, \ x_4^{33} = y^{27}, \ y^{31} = U_{fa},$  59.
$y^{32} = U_{fb}, \ y^{33} = U_{fc}.$ Taking into account the relationships of (56) and the equations according to which the units 22–27 form their outputs, we find:
$y^{22} = x_1^{22} x_2^{22} + x_3^{22} x_4^{22} = \cos\omega_o t \cos\gamma + \sin\omega_o t \sin\gamma = \cos(\gamma - \omega_o t) = \cos\delta,$
$y^{23} = x_1^{23} x_2^{23} + x_3^{23} x_4^{23} = \cos(\omega_o t + 120°)\cos\gamma + \sin(\omega_o t + 120°)\sin\gamma = \cos(\gamma - \omega_o t - 120°) = \cos(\delta - 120°),$
$y^{24} = x_1^{24} x_2^{24} + x_3^{24} x_4^{24} = \cos(\omega_o t + 240°)\cos\gamma + \sin(\omega_o t + 240°)\sin\gamma = \cos(\gamma - \omega_o t - 240°) = \cos(\delta - 240°),$
$y^{25} = x_1^{25} x_2^{25} - x_3^{25} x_4^{25} = \sin\omega_o t \cos\gamma - \cos\omega_o t \sin\gamma = -\sin(\gamma - \omega_o t) = -\sin\delta,$  60.
$y^{26} = x_1^{26} x_2^{26} - x_3^{26} x_4^{26} = \sin(\omega_o t + 120°)\cos\gamma - \cos(\omega_o t + 120°)\sin\gamma = -\sin(\gamma - \omega_o t - 120°) = -\sin(\delta - 120°),$
$y^{27} = x_1^{27} x_2^{27} - x_3^{27} x_4^{27} = \sin(\omega_o t + 240°)\cos\gamma - \cos(\omega_o t + 240°)\sin\gamma = -\sin(\gamma - \omega_o t - 240°) = -\sin(\delta - 240°).$ Taking into account equation (60) relationships (57) for the units 28 and 29 may be written as follows:
$x_1^{28} = x_1^{29} = -i_{fa}, \ x_3^{28} = x_3^{29} = -i_{fb}, \ x_5^{28} = x_5^{29} = -i_{fc},$
$x_2^{28} = \cos\delta, \ x_4^{28} = \cos(\delta - 120°), \ x_6^{28} = \cos(\delta - 240°),$
$x_2^{29} = -\sin\delta, \ x_4^{29} = -\sin(\delta - 120°), \ x_6^{29} = -\sin(\delta - 240°).$  61.

As to equation (4) governing the units 28 and 29, the outputs of these units will be:
$y^{28} = \tfrac{2}{3}(x_1^{28} x_2^{28} + x_3^{28} x_4^{28} + x_5^{28} x_6^{28}) = -\tfrac{2}{3}[i_{fa}\cos\delta + i_{fb}\cos(\delta - 120°) + i_{fc}\cos(\delta - 240°)] = -I_{fq},$  62.
$y^{29} = \tfrac{2}{3}(x_1^{29} x_2^{29} + x_3^{29} x_4^{29} + x_5^{29} x_6^{29}) = -\tfrac{2}{3}[-i_{fa}\sin\delta - i_{fb}\sin(\delta - 120°) - i_{fc}\sin(\delta - 240°)] = -I_{fd}.$ According to relationships (55) (58) and (62), the outputs of the unit 30 will be:
$y_1^{30} = (I+K)(\alpha_o + \alpha_1 x_1^{30})x_2^{30} - (I+K)\beta_o x_3^{30} + Kx_4^{30}$
$= (I+K)(\alpha_o + \alpha_o S) - KI_{fq},$  63.
$y_2^{30} = (I+K)(\alpha_o + \alpha_1 x_1^{30})x_3^{30} + (I+K)\beta_o x_2^{30} + Kx_5^{30}$
$= (I+K)\beta_o - KI_{fd}.$ Taking into account relationships (59) and equations (60) and (63), we obtain the signals at the outputs of the units 31, 32 and 33:
$y^{31} = x_1^{31} x_2^{31} + x_3^{31} x_4^{31} = y_1^{30} y^{22} + y_2^{30} y^{25} = [(I+K)(\alpha_o + \alpha_1 S) - KI_{fq}]\cos\delta - [(I+K)\beta_o - KI_{fd}]\sin\delta,$
$y^{32} = x_1^{32} x_2^{32} + x_3^{32} x_4^{32} = y_1^{30} y^{23} + y_2^{30} y^{26} = [(I+K)(\alpha_o + \alpha_1 S) - KI_{fq}]\cos(\delta - 120°) - [(I+K)\beta_o - KI_{fd}]\sin(\delta - 120°),$  64.
$y^{33} = x_1^{33} x_2^{33} + x_3^{33} x_4^{33} = y_1^{30} y^{24} + y_2^{30} y^{27} = [(I+K)(\alpha_o + \alpha_1 S) - KI_{fq}]\cos(\delta - 240°) - [(I+K)\beta_o - KI_{fd}]\sin(\delta - 240°),$ or finally:
$U_{fa} = (I+K)(\alpha_o + \alpha_1 S)\cos\delta - (I+K)\beta_o \sin\delta - K(I_{fq}\cos\delta - I_{fd}\sin\delta),$  65.

$U_{fc} = (I + K)(\alpha_0 + \alpha_1 S)\cos(\delta - 240°) - (I + K)\beta_0 \sin(\delta - 240°) - K[I_{fq}\cos(\delta - 240°) - I_{fd}\sin(\delta - 240°)]$.

Expressions (65) represent a composite control law for the machine 35 with a three-phase rotor. In order to make sure that the law has been formulated correctly, it is enough to show that the quantities at factor K are actually equal to $i_{fa}$, $i_{fb}$ and $i_{fc}$ respectively. This is easily done by substituting in (65) the expressions for $I_{fq}$ and $I_{fd}$ from (62) and taking into account that for a three-phase system $i_{fa} + i_{fb} + i_{fc} = 0$.

Substituting $\nu$ for $\delta$, we find the control law for the machine 35 operating in a "generalized synchronous" mode.

Figure 22:
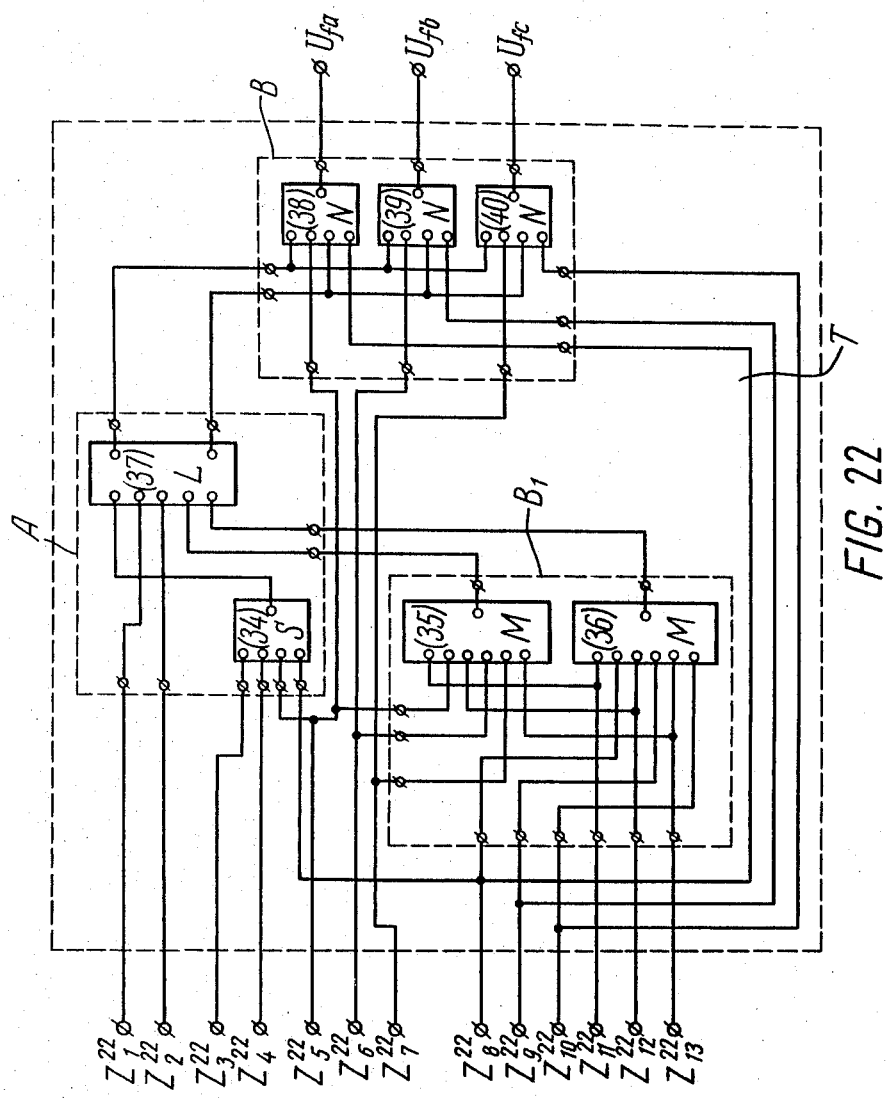
FIG. 22 is an electrical circuit diagram of means for controlling a machine with a three-phase rotor forming reference voltages at the frequency of rotor rotation.

Let us consider the functional relationships and the principle of operation of means T of FIG. 22.

FIG. 22 is a circuit diagram of a means T for forming reference control voltages first at a frequency of rotor rotation equation to $\omega$ for the case of a three-phase rotor. The figure contains the following designations: 34 — slip unit S; 35 and 36 — inverters M; 37 — master control unit L; and 38, 39 and 40 — converters N.

The units 35 and 36 obey equation (4); the unit 37 obeys equation (2); and the units 38, 39 and 40 obey equation (5).

The circuit diagram of FIG. 22 features the following relationships:
for the units 34 and 37:

$$x_1^{37} = y^{34} = S;$$
66.

for the units 35 and 36:
$x_1^{35} = x_1^{36} = -i_{fa}$, $x_3^{35} = x_3^{36} = -i_{fb}$, $x_5^{35} = x_5^{36} = -i_{fc}$,
$x_2^{35} = \cos\omega_0 t$, $x_4^{35} = \cos(\omega_0 t + 120°)$,
$x_6^{35} = \cos(\omega_0 t + 240°)$, $x_2^{36} = \sin\omega_0 t$,
$x_4^{36} = \sin(\omega_0 t - 120°)$, $x_6^{36} = \sin(\omega_0 t - 240°)$;
67.

for the unit 37:
$x_2^{37} = \cos\gamma \ (\cos\omega_H t)$, $x_3^{37} = \sin\gamma \ (\sin\omega_H t)$,
$x_4^{37} = y^{35}$, $x_5^{37} = y^{36}$;
68.

from the units 38, 39 and 40:
$x_1^{38} = x_1^{39} = x_1^{40} = y_1^{37}$, $x_3^{38} = x_3^{39} = x_3^{40} = y_2^{37}$,
$x_2^{38} = \cos\omega_0 t$, $x_4^{38} = \sin\omega_0 t$, $x_2^{39} = \cos(\omega_0 t + 120°)$,
$x_4^{34} = \sin(\omega_0 t + 120°)$; $x_2^{40} = \cos(\omega_0 t + 240°)$,
69.
$x_4^{40} = \sin(\omega_0 t + 240°)$, $y^{38} = U_{fa}$,
$y^{39} = U_{fb} = y^{40} = U_{fc}$;

The units 35 and 36 generate the following output signals:
$y^{35} = \tfrac{2}{3}(x_1^{35}x_2^{35} + x_3^{35}x_4^{35} + x_5^{35}x_6^{35}) = \tfrac{2}{3}[(-i_{fa})\cos\omega_0 t + (-i_{fb})\cos(\omega_0 t + 120°) + (-i_{fc})\cos(\omega_0 t + 240°)] = -I_{fq}^R$,
70.
$y^{36} = \tfrac{2}{3}(x_1^{36}x_2^{36} + x_3^{36}x_4^{36} + x_5^{36}x_6^{36}) = \tfrac{2}{3}[-i_{fa}\sin\omega_0 t - i_{fb}\sin(\omega_0 t + 120°) - i_{fc}\sin(\omega_0 t + 240°)] = -I_{fd}^R$;

The master control unit 37 generates the signals:
$y_1^{37} = (I+K)(\alpha_0 + \alpha_1 x_1^{37})x_2^{37} - (I+K)\beta_0 x_3^{37} + K x_4^{37}$
$= (I+K)(\alpha_0 + \alpha_1 S)\cos\gamma - (I+K)\beta\sin\gamma - KI_{fq}^R$,
71.
$y_2^{37} = (I+K)(\alpha_0 + \alpha_1 x_1^{37})x_3^{37} + (I+K)\beta_0 x_2^{37} + K x_5^{37}$
$= (I+K)(\alpha + \alpha_1 S)\sin\gamma + (I+K)\beta_0\cos\gamma - KI_{fd}^R$;

Taking into account (69) and (71), the relationships for the first and third inputs of the units 38, 39 and 40 will be rewritten in the following manner:
$x_1^{38} = x_1^{39} = x_1^{40} = (I+K)(\alpha_0 + \alpha_1 S)\cos\gamma - (I+K)\beta_0\sin\gamma - KI_{fq}^R$,
72.
$x_3^{38} = x_3^{39} = x_3^{40} = (I+K)(\alpha_0 + \alpha_1 S)\sin\gamma + (I+K)\beta_0\cos\gamma - KI_{fd}^R$.

On the basis of (72) and (69) for the rest of the inputs of the units 38, 39 and 40, the outputs of these units will be:
$y^{38} = x_1^{38}x_2^{38} + x_3^{38}x_4^{38} = [(I+K)(\alpha_0 + \alpha_1 S)\cos\gamma - (I+K)\beta_0\sin\gamma - KI_{fq}^R]\cos\omega_0 t + [(I+K)(\alpha_0 + \alpha_1 S)\sin\gamma + (I+K)\beta_0\cos\gamma - KI_{fd}^R]\sin\omega_0 t = (I+K)(\alpha_0 + \alpha_1 S)\cos(\gamma - \omega_0 t) - (I+K)\beta_0\sin(\gamma - \omega_0 t) - K(I_{fq}^R\cos\omega_0 t + I_{fd}^R\sin\omega_0 t)$, $y^{39} = x_1^{39}x_2^{39} + x_3^{39}x_4^{39} = [(I+K)(\alpha_0 + \alpha_1 S)\cos\gamma - (I+K)\beta_0\sin\gamma - KI_{fq}^R]\cos(\omega_0 t + 120°) + [(I+K)(\alpha_0 + \alpha_1 S)\sin\gamma + (I+K)\beta_0\cos\gamma - KI_{fd}^R] \cdot \sin(\omega_0 t + 120°) = (I+K)(\alpha_0 + \alpha_1 S)\cos(\gamma - \omega_0 t - 120°) - (I+K)\beta\sin(\gamma - \omega_0 t - 120°) - K[I_{fq}^R\cos(\omega_0 t + 120°) + I_{fd}^R\sin(\omega_0 t + 120°)]$,
73.
$y^{40} = x_1^{40}x_2^{40} + x_3^{40}x_4^{40} = [(I+K)(\alpha_0 + \alpha_1 S)\cos\gamma - (I+K)\beta_0\sin\gamma - KI_{fq}^R]\cos(\omega_0 t + 240°) + [(I+K)(\alpha_0 + \alpha_1 S)\sin\gamma + (I+K)\beta_0\cos\gamma - KI_{fd}^R] \cdot \sin(\omega_0 t + 240°) = (I+K)(\alpha_0 + \alpha_1 S)\cos(\gamma - \omega_0 t - 240°) - (I+K)\beta_0\sin(\gamma - \omega_0 t - 240°) - K[I_{fq}^R\cos(\omega_0 t + 240°) + I_{fd}^R\sin(\omega_0 t + 240°)]$, or
$U_{fa} = (I+K)(\alpha_0 + \alpha_1 S)\cos\delta - (I+K)\beta_0\sin\delta - K[I_{fq}^R\cos\omega_0 t + I_{fd}^R\sin\omega_0 t]$,
$U_{fb} = (I+K)(\alpha_0 + \alpha_1 S)\cos(\delta - 120°) - (I+K)\beta_0\sin(\delta - 120°) - K[I_{fq}^R\cos(\omega_0 t + 120°) + I_{fd}^R\sin(\omega_0 t + 120°)]$,
74.
$U_{fc} = (I+K)(\alpha_0 + \alpha_1 S)\cos(\delta - 240°) - (I+K)\beta_0\sin(\delta - 240°) - K[I_{fq}^R\cos(\omega_0 t + 240°) + I_{fd}^R\sin(\omega_0 t + 240°)]$.

The expression of (74) defines the control law formed. It is easy to verify, just as for the previously discussed circuit diagram, that the quantities in square brackets are rotor currents $i_{fa}$, $i_{fb}$ and $i_{fc}$, and that consequently, the control law has been formed correctly. Substituting $\nu t$ for $\delta$, we can obtain the control law for the "generalized synchronous" mode of operation.

DESCRIPTION OF THE OPERATION OF SLIP UNIT S (FIG. 13)

It will be noted that the discussed circuit embodies the functional relationship of (1) approximately, but with a sufficient degree of accuracy for practical purposes. The principle of operation of the circuit is as follows:

As follows from the previous section of the description, signals $\omega_p\cos\gamma$ and $\omega_p\sin\gamma$ are delivered to the respective inputs $x_1^S$ and $x_2^S$. The signals are delivered to the primary windings of two transformers whose secondary windings have earthed neutrals. Thus, at the terminals of the secondary windings of these transformers four respective signals are formed: $\omega_p\cos\gamma$, $-\omega_p\cos\gamma$, $\omega_p\sin\gamma$ and $-\omega_p\sin\gamma$, which are furnished to four diodes coupled in phase. As a result of four-phase rectification, at point "C" on the resistor 18 we obtain the signal:

$$x_c = \omega_p + \Delta\omega_p(t) \approx \omega_p,$$
75.

where $\Delta\omega_p(t)$ is a signal containing higher harmonics of frequency $\omega_p$. The fundamental harmonic of signal $\Delta\omega_p(t)$ has a frequency of $4\omega_p$.

Respective signals $\cos\omega_0 t$ and $\sin\omega_0 t$ are applied to inputs $x_3^S$ and $x_4^S$, thence to differentiating RC strings and then to the amplifiers 9 where they are amplified and inverted to give a four-phase system of signals $-\omega_o\cos\omega_o t$, $-\omega_o\cos\omega_o t$, $\omega_o\sin\omega_o t$, and $-\omega_o\sin\omega_o t$ — which is furnished to four diodes coupled in opposition. After four-phase rectification, at point "b" on the resistor 17 we obtain the signal:

$$x_b = -\omega_o - \Delta\omega_o(t),  \quad 76.$$

where $\Delta\omega_o(t)$ is a signal containing higher harmonic frequencies $\omega_o$. The fundamental harmonic of signal $\Delta\omega_o(t)$ has a frequency of $4\omega_o$. It is seen that in the discussed unit the operation of square root extraction from the sum of squares is performed approximately with the use of rectifiers. From (73) and (76) it follows that the output of the amplifier 16, i.e. the output of unit S, is equal to:

$$y^S = \omega_p - \omega_o + \Delta\omega_p(t) - \Delta\omega_o(t) \approx \omega_p - \omega_o = S.  \quad 77.$$

OPERATION OF MASTER CONTROL UNIT L

Figure 14:
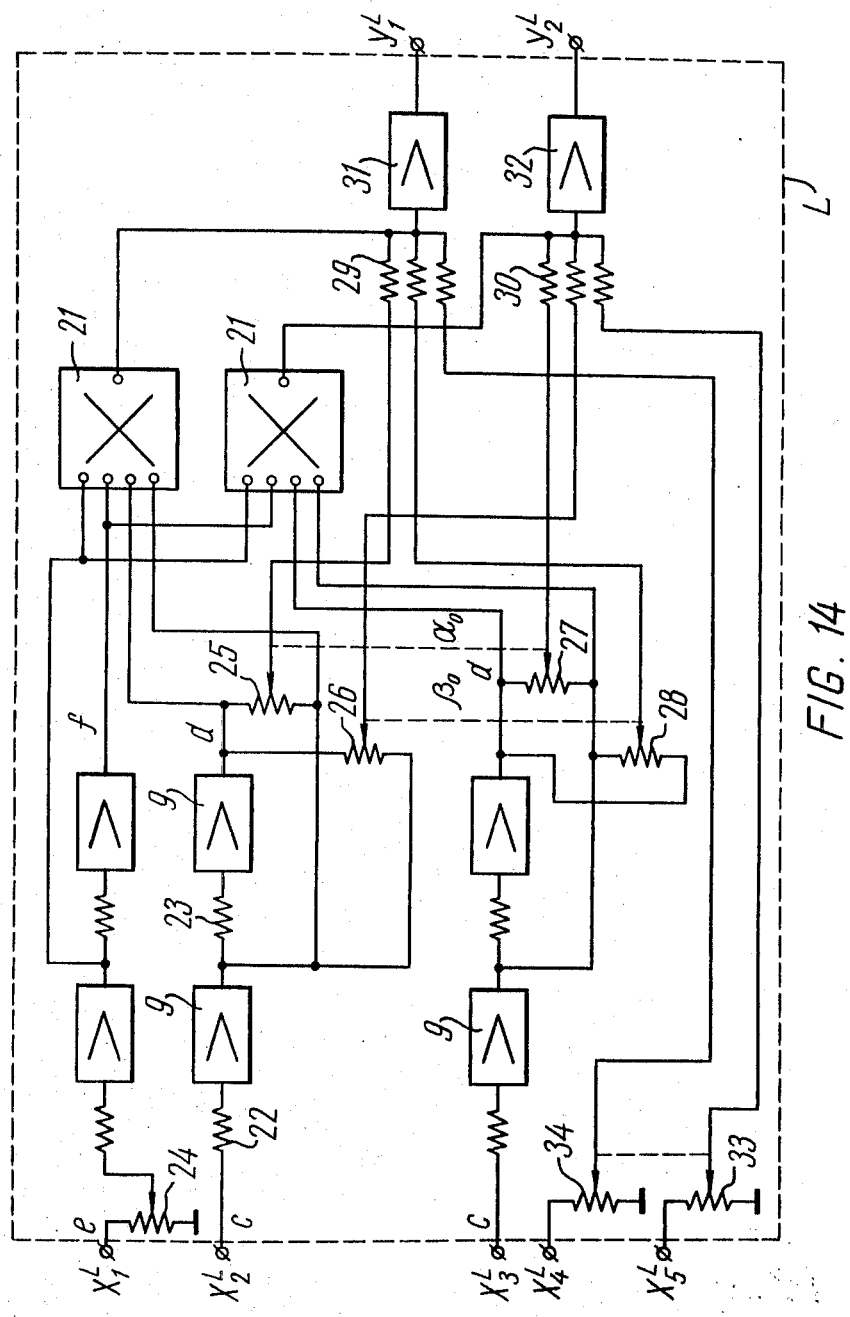
FIG. 14 is an electrical circuit diagram of master control unit L of the control circuit.

The circuit diagram of the unit is given in FIG. 14 containing the following designations:
24 — potentiometer; 9 — inverters; 25–27, 26–28 and 34–33 — twin potentiometers; 21 — multiplier units; and 31 and 32 — output summing amplifiers.

The inputs and outputs of the discussed unit are numbered sequentially from top to bottom, as has been arranged before. The circuit forms input-output functional relationships in the following manner. Signal $x_1^L$ is furnished to the input of the potentiometer 24 whose slider occupies a position corresponding to a certain factor $\alpha_1'$, so that at the output of the potentiometer there is formed a signal $\alpha_1'x_1^L$. Then this signal is twice inverted, and signals $-\alpha_1'x_1^L$ and $\alpha_1'x_1^L$ from the inverters 9 are respectively fed to the first and second inputs of the multiplier units 21. Direct and inverted signals are an absolute prerequisite for the correct operation of the multiplier units, i.e., if the amplifier unit output is to equal to $x_1 x_2$, signals $x_1, -x_1$ and $x_2, -x_3$ are to be fed to the respective inputs of the unit.

Double inversion is required here in order to match the internal resistances, the output resistance of the signal source and the input resistance of the multiplier unit. the multiplier unit requires that the source of signals should have a low output resistance, which might not be the case as, for example, Signals $x_2^L$ and $x_3^L$ are furnished to the inputs of the inverters 9, twice inverted there and delivered to the third and fourth inputs of the multiplier units 21. Thus, the outputs of the multiplier units 21 are:

$$\alpha_1' x_1^L x_2^L \text{ and } \alpha_1' x_1^L x_2^L.  \quad 77a.$$

Simultaneously signal $x_2^L$ is fed to the upper terminals of the potentiometers 25 and 26, while signal $-x_2^L$ is delivered to the lower terminals of these potentiometers. Simultaneously signal $x_3^L$ is fed to the upper terminal of the potentiometer 27 and to the lower terminal of the potentiometer 28, whereas signal $-x_3^L$ is fed to the lower terminal of the potentiometer 27 and to the upper terminal of the potentiometer 28. The position of the sliders of the twin potentiometers 25–27 and 26–28 corresponds to certain factors $\alpha_o'$, potentiometer 25–27/ and $\beta_o'$, potentiometer 26–28. By applying direct and inverted signals to the potentiometers 25–27 and 26–28, the signs of factors $\alpha_o'$ and $\beta_o'$ can be changed. In accordance with the above-described place of the twin potentiometer 25–27 in the circuit, its upper and lower sliders generate the respective signals:

$$\alpha_o' x_2^L \text{ and } \alpha_o' x_3^L.  \quad 77b.$$

Similarly, it is found that the upper and lower sliders of the potentiometer 26–28 generate the respective signals:

$$-\beta_o' x_3^L \text{ and } \beta_o' x_2^L.  \quad 77c.$$

The minus sign is due to the opposition-coupling of the leads of the potentiometer 28 as against the potentiometers 25, 26 and 27.

Signals $x_4^L$ and $x_5^L$ are delivered to the twin potentiometer 33–34 whose sliders occupy a position corresponding to a certain factor $K'$, the slider of the potentiometer 34 generating signal $K'x_4^L$ and the slider of the potentiometer 33 generating signal $K'x_5^L$.

The signals from the multiplier units 21 and the potentiometers 25, 28 and 34, i.e., $\alpha_1'x_1^L x_2^L$, $\alpha_o'x_2^L$, $-\beta_o' x_3^L$ and $K'x_4^L$, are summed up by the summing amplifier 31 with a common gain $K_\Sigma$. Similarly, the signals from the multiplier unit 21 and the potentiometers 26, 27 and 33, i.e. $\alpha_1'x_1^L x_2^L$, $\alpha_o'x_3^L$, $\beta_o'x_2^L$ and $K'x_5^L$, are summed up by the summing amplifier 32 with a common gain also equal to $K_\Sigma$.

As a result, the outputs of the summing amplifiers are equal to:

$$y_1^L = K_\Sigma (\alpha_o' + \alpha_1' x_1^L)x_2^L - K_\Sigma \beta_o' x_3^L + K_\Sigma K' x_4^L,$$
$$y_2^L = K_\Sigma (\alpha_o' + \alpha_1' x_1^L)x_3^L + K_\Sigma \beta_o' x_2^L + K_\Sigma K' x_5^L. \quad 78.$$

Choosing the value of factor $K_\Sigma$ such as to satisfy the relationships $$\alpha_o = \alpha_o' K_\Sigma, \quad \alpha_1' K_\Sigma = \alpha_1, \quad \beta_o = \beta_o' K_\Sigma, \quad K_\Sigma K' = K, \quad 79.$$

we shall obtain precisely the functional relationships which have been given for the master control unit, formula (2). The functional relationship for the modified master control unit of equation (3) will be obtained by interchanging the leads of the potentiometers 26 and 28, as well as the third and fourth leads of the multiplier unit generating signal $\alpha_1'x_1^L x_3^L$. In such a case, the slider of the potentiometer 26 will form signal $-\alpha_o'x_3^L$; the slider of the potentiometer 28 will form signal $\beta_o'x_3^L$; and the multiplier units will generate signal $-\alpha_1'S$. As a result, the outputs of the summing amplifiers 31 and 32 will correspond to equation (3):

$$y_1^L = K_\Sigma (\alpha_o' + \alpha_1' x_1^L)x_2^L + \beta_o x_3^L + K_\Sigma K x_4^L,$$
$$y_2^L = -K_\Sigma (\alpha_o' + \alpha_1' x_1^L)x_3^L + \beta_o x_2^L + K_\Sigma K x_5^L. \quad 80.$$

OPERATION OF INVERTER M

Figure 15:
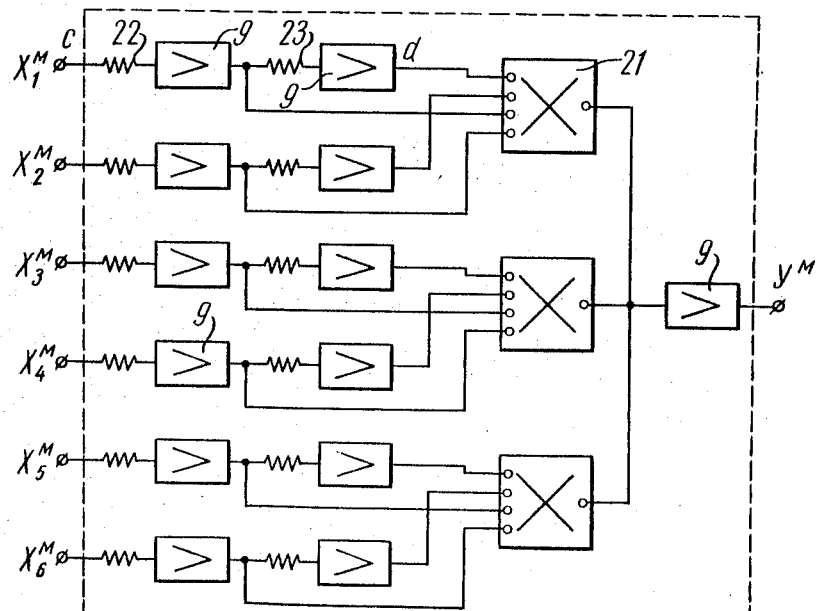
FIG. 15 is an electrical circuit diagram of inverter M of the control circuit.

The circuit diagram of the unit is given in FIG. 15 containing the following designations: 9 — inverters, a summing amplifier; 21 — multiplier units.

The inputs are numbered sequentially from top to bottom in keeping with the previously agreed-upon condition. Thus, the inputs of the unit are designated: $x_1^M$; $x_2^M$; $x_3^M$; $x_4^M$; $x_5^M$ and $x_6^M$, and the output is designated $y^M$.

The twice inverted signals $/x_1^M$ and $x_2^M/$ are furnished to the inputs of the upper multiplier unit 21, i.e., the input signals of this unit are $x_1^M$; $-x_1^M$; $x_2^M$; $-x_2^M$, which are required for the normal operation of the multiplier unit for reasons described while discussing the operation of master control unit L of FIG. 14.

The twice inverted signals $x_3^M$ and $x_4^M$ are furnished to the inputs of the middle multiplier unit 21, i.e., the input signals of this unit are $x_3^M$; $-x_3^M$; $x_4^M$; $-x_4^M$.

Similarly, the twice inverted signals $x_5^M$ and $x_6^M$ are fed to the inputs of the lower multiplier unit 21, i.e., the input signals of this unit are $x_5^M$; $-x_5^M$; $x_6^M$; $-x_6^M$.

Thus, the outputs of the upper, middle and lower multiplier units are respectively $x_1^M x_2^M$, $x_3^M x_4^M$ and $x_5^M x_6^M$. Since the outputs of the multiplier units are fed to the summing unit having a gain of ⅔ at each input, the summing unit will give:

$$y^M = (x_1^M x_2^M + x_3^M x_4^M + x_5^M x_6^M) \; ⅔,$$

81.

which corresponds to the functional relationship of formula (4)

OPERATION OF CONVERTER N

The circuit diagram of the unit is given in FIG. 16 which contains the following designations: 9 — inverters, a summing amplifier; 21 — multiplier units. Comparing the circuits in FIGS. 15 and 16, one notes that while the circuit of FIG. 15 comprises three independent sections incorporating four inverters and one multiplier unit, the circuit of FIG. 16, the circuit discussed, comprises two sections of this sort. Both circuits comprise one output adder summing up the signals of the component sections.

Like in the previous case, invertion circuit, here the unit inputs are numbered sequentially from top to bottom. It is seen that signals $x_1^N$, $x_2^N$ are related to the first section alone, while signals $x_3^N$, $x_4^N$ are related only to the second section. Hence, by analogy with the circuit of FIG. 15, the outputs of the multiplier units corresponding to the first and second sections will respectively generate the signals:

$$x_1^N x_2^N; \; x_3^N x_4^N.$$

81a.

Therefore, the output adder will form the following signal:

$$y^N = k_\Sigma \; (x_1^N x_2^N + x_3^N x_4^N),$$

82.

where $K_\Sigma$ is the desired gain of the output summing amplifier. Letting $K_\Sigma = 1$, the above-given formula (5) is obtained. Transposing the output leads of the inverters on the side of the multiplier unit forming signal $x_3^N x_4^N$, the sign of the product will be altered, i.e., the output of the multiplier unit will be $-x_3^N x_4^N$, which gives the output $y^N$ of the output adder determined by equation (6).

What is claimed is:

1. A method of controlling an asynchronized-synchronous machine comprising; impressing a voltage of varying frequency, phase and amplitude on the rotor or stator winding of the machine, varying the frequency of said voltage in proportion to an angle between the voltage vector of a power supply mains connected to the stator or rotor winding and the e.m.f. vector of a synchronous tachometer generator connected with a rotor shaft of the machine, varying the amplitude of said voltage in proportion to the slip of the machine, forming two independently controlled e.m.f. components induced by the rotor or stator currents in the stator or rotor winding of the machine, one said e.m.f. component coinciding with the direction of the voltage vector of the stator or rotor circuit, the other component being perpendicular to this vector, and varying the amplitude of the former component in accordance with the setting of a frequency-forming means, while varying the amplitude of the latter component in proportion to the instantaneous slip of the machine being controlled.

2. A method of controlling an asynchronized-synchronous machine as claimed in claim 1, comprising maintaining the frequency-forming means setting to be constant.

3. A method of controlling an asynchronized-synchronous machine as claimed in claim 1, comprising varying the frequency-forming means setting in proportion to the voltage across the stator or rotor of the machine.

4. A method of controlling an asynchronized-synchronous machine as claimed in claim 1, comprising varying the frequency-forming means setting as the function of the power factor of the machine.

5. A method of controlling an asynchronized-synchronous machine as claimed in claim 1, comprising forming said two e.m.f. components in the stator or rotor winding with the use of a frequency converter and means for controlling the former, the latter means comprising an operational and a functional unit, feeding the outputs thereof to the respective inputs of each other, and feeding the second output of the functional unit through the other operational unit of said means to a frequency converter, delivering signals from a power supply mains and from a rotor speed transmitter to the input of the functional unit, while delivering the signals from a rotor current transducer to the input of one operational unit.

6. A method of controlling an asynchronized-synchronous machine as claimed in claim 1, comprising feeding the signal from a frequency-forming means to the input of a functional unit.

7. A method of controlling an asynchronized-synchronous machine as claimed in claim 5, comprising forming, from the signals from the power supply mains and from the rotor speed transmitter, two independent reference control signals in the functional unit, comparing these signals with the output signals of one operational unit, converting the signals in the other operational unit to ensure independent control of e.m.f. components in the stator or rotor and improving the steady-state and transient characteristics of the machine.

8. A method of controlling an asynchronized-synchronous machine as claimed in claim 7, in which said two reference control signals are D.C. formed.

9. A method of controlling an asynchronized-synchronous machine as claimed in claim 7, in which said two reference control signals are formed at the frequency of rotation of the rotor.

10. A method of controlling an asynchronized-synchronous machine as claimed in claim 7, in which said two reference control signals are formed at the frequency of the power supply mains.

11. A control circuit for controlling an asynchronized-synchronous machine through impressing a voltage of varying frequency, phase and amplitude on a rotor or stator winding of the machine, comprising a frequency converter, means for controlling said converter, a rotor speed transmitter, a frequency-forming means and a rotor current transducer including at least two operational units, each said unit being built around at least two converters, and a functional unit incorporating a slip unit, a master control unit and at least two converters.

12. A control circuit for controlling an asynchronized-synchronous machine as claimed in claim 11, in which said slip unit comprises two series strings, each of which incorporates two operational amplifiers, a capacitor, two resistors and a rectifier, one of said resistors decoupling two operational amplifiers, and an additional rectifier shunts one of said resistors, one said operational amplifier and said rectifier connected in series with one another, while another resistor having one lead connected to ground is coupled between the plate of said capacitor and one of said resistors, and four anodes of the rectifiers of said two strings are interconnected and coupled via a resistor to the input of an operational amplifier, with two single-phase full-wave rectifiers being coupled via a resistor to the output of said operational amplifier.

13. A control circuit for controlling an asynchronized-synchronous machine as claimed in claims 11 series strings, each of which comprises two operational amplifiers and resistors, one of the resistors decoupling two operational amplifiers, and also a string with an additional potentiometer, with the output of each amplifier of said strings being coupled to the respective inputs of multiplier units, and the operational amplifiers coupled at the end of each of said strings with the resistors are shunted in common by potentiometers, whereof the sliders are respectively coupled via resistors to the inputs of two additional operational amplifiers, with the outputs of respective multiplier units being coupled to the same inputs of the additional amplifiers, and potentiometers being respectively coupled to the other inputs of the very same additional amplifiers.

14. A control circuit for controlling an asynchronized-synchronous machine as claimed in claim 11, in which said inverter comprises three groups of strings, each comprising two strings each of which incorporates, in series two operational amplifiers and two resistors, one of the resistors decoupling two operational amplifiers, and the outputs of each string are coupled to the inputs of three respective multiplier units.

15. A control circuit for controlling an asynchronized-synchronous machine as claimed in claim 11, in which said converter comprises two groups of series strings, each comprising two strings each of which incorporates two operational amplifiers and two resistors, one of the resistors decoupling two operational amplifiers, and the outputs of each string are coupled to the inputs of two respective multiplier units, whereof the outputs are interconnected and coupled to the input of an additional operational amplifier.

16. A control circuit for controlling an asynchronized-synchronous machine through impressing a voltage of varying frequency, phase and amplitude on a rotor or stator winding of the machine, comprising a frequency converter, means for controlling said converter, a rotor speed transmitter, a frequency-forming means and a rotor current transducer including at least two operational units, each said unit being built around at least two converters, a functional unit incorporating a slip unit and a master control unit.

17. A control circuit for controlling an asynchronized-synchronous machine through impressing a voltage of varying frequency, phase and amplitude on a rotor or stator winding of the machine, comprising a frequency converter, means for controlling said converter, a rotor speed transmitter, a frequency-forming means and a rotor current transducer including at least two operational units, one of said units being built around at least two converters, and the other incorporating at least two inverters, and a functional unit incorporating a slip unit and a master control unit.

* * * * *